United States Patent
Zhong

(10) Patent No.: US 9,973,725 B2
(45) Date of Patent: May 15, 2018

(54) MODULAR TELEVISION SYSTEM

(71) Applicants: Hisense Hiview Tech Co., Ltd., Qindao (CN); Hisense USA Corp., Suwanee, GA (US); Hisense International Co., Ltd., Qingdao (CN)

(72) Inventor: Sheng Zhong, San Jose, CA (US)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 408 days.

(21) Appl. No.: 14/677,311

(22) Filed: Apr. 2, 2015

(65) Prior Publication Data

US 2016/0227157 A1    Aug. 4, 2016

Related U.S. Application Data

(60) Provisional application No. 62/125,871, filed on Feb. 2, 2015, provisional application No. 62/116,831, filed on Feb. 16, 2015.

(51) Int. Cl.

| | |
|---|---|
| *H04N 5/655* | (2006.01) |
| *G09G 5/18* | (2006.01) |
| *G09G 3/34* | (2006.01) |
| *H04N 5/64* | (2006.01) |
| *G09G 5/00* | (2006.01) |

(52) U.S. Cl.
CPC ........... *H04N 5/655* (2013.01); *G09G 3/3406* (2013.01); *G09G 5/005* (2013.01); *G09G 5/18* (2013.01); *H04N 5/64* (2013.01); *G09G 2320/0626* (2013.01); *G09G 2330/02* (2013.01); *G09G 2340/02* (2013.01); *G09G 2360/08* (2013.01); *G09G 2370/042* (2013.01); *G09G 2370/06* (2013.01); *G09G 2370/12* (2013.01); *G09G 2370/16* (2013.01)

(58) Field of Classification Search
CPC ..................................................... H04N 5/655
See application file for complete search history.

(56) References Cited

U.S. PATENT DOCUMENTS

| | | | | |
|---|---|---|---|---|
| 6,055,029 | A * | 4/2000 | Kurihara | G02B 6/0088 349/58 |
| 6,388,722 | B1 * | 5/2002 | Yoshii | G02B 6/0083 349/58 |

(Continued)

*Primary Examiner* — Jay Patel
*Assistant Examiner* — Irfan Habib
(74) *Attorney, Agent, or Firm* — Brinks Gilson & Lione

(57) ABSTRACT

A modular television system may include a display subsystem and a television module subsystem. The display subsystem has a housing that contains a display panel for displaying images and display subsystem port. The television module subsystem has a housing that contains a main board and a television module port in communication with the main board. In another embodiment, the modular television system may include a main module. The main module may include a main module processor, a display controller, an audio output device, and at least one computing module port. Each of the display controller, audio output device and computing module ports are in communication with the main module processor. The main module processor functions to present audio and video received by the main module processor. In addition, the main module processor is configured to communicate with a removable computing module.

17 Claims, 33 Drawing Sheets

(56) References Cited

U.S. PATENT DOCUMENTS

| | | | | |
|---|---|---|---|---|
| 6,909,475 | B2* | 6/2005 | Kojima | G06F 1/1626 349/58 |
| 7,250,987 | B2* | 7/2007 | Goyal | H04N 5/44 348/555 |
| 8,208,078 | B2* | 6/2012 | Yokawa | H04N 5/655 348/836 |
| 8,217,396 | B2* | 7/2012 | Yamazaki | H01L 27/12 257/72 |
| 8,687,042 | B2* | 4/2014 | Karaoguz | G06F 3/14 348/42 |
| 9,049,409 | B2* | 6/2015 | Lee | H04N 5/645 |
| 9,323,087 | B2* | 4/2016 | Kubo | G02F 1/133308 |
| 9,323,088 | B2* | 4/2016 | Tomomasa | G02F 1/133308 |
| 9,383,506 | B2* | 7/2016 | Hosoki | G02F 1/133308 |
| 2002/0106018 | A1* | 8/2002 | D'Luna | G06T 9/007 375/240.01 |
| 2006/0289201 | A1* | 12/2006 | Kim | G02F 1/133603 174/261 |
| 2007/0019419 | A1* | 1/2007 | Hafuka | G02F 1/133603 362/373 |
| 2007/0081344 | A1* | 4/2007 | Cappaert | G02B 6/0085 362/373 |
| 2007/0153515 | A1* | 7/2007 | Hong | G02F 1/133603 362/237 |
| 2008/0036940 | A1* | 2/2008 | Song | G02F 1/133608 349/61 |
| 2008/0089028 | A1* | 4/2008 | Kim | G02F 1/133608 361/695 |
| 2008/0115186 | A1* | 5/2008 | Cho | H04N 5/4403 725/131 |
| 2008/0129920 | A1* | 6/2008 | Ito | G02F 1/133308 349/60 |
| 2008/0165496 | A1* | 7/2008 | Kang | G02F 1/133308 361/692 |
| 2008/0285290 | A1* | 11/2008 | Ohashi | G02B 6/0085 362/373 |
| 2009/0015716 | A1* | 1/2009 | Doedens | H04N 5/4401 348/564 |
| 2009/0046212 | A1* | 2/2009 | Tsubata | G02F 1/13471 348/790 |
| 2009/0122218 | A1* | 5/2009 | Oh | G02F 1/133385 361/679.21 |
| 2010/0192171 | A1* | 7/2010 | Dozoretz | H04N 5/64 725/5 |
| 2011/0211115 | A1* | 9/2011 | Tsai | H04N 5/44 348/441 |
| 2011/0273616 | A1* | 11/2011 | Zhai | H04N 5/765 348/554 |
| 2012/0092562 | A1* | 4/2012 | Omiya | H04N 5/64 348/725 |
| 2012/0167126 | A1* | 6/2012 | Paek | H04N 21/42207 725/14 |
| 2012/0281151 | A1* | 11/2012 | Abe | G02B 6/0091 348/739 |
| 2013/0061268 | A1* | 3/2013 | Rothschild | H04N 21/234318 725/51 |
| 2016/0119668 | A1* | 4/2016 | Jung | H04N 21/42623 725/153 |
| 2016/0183388 | A1* | 6/2016 | Murakami | G06F 1/184 361/679.21 |

* cited by examiner

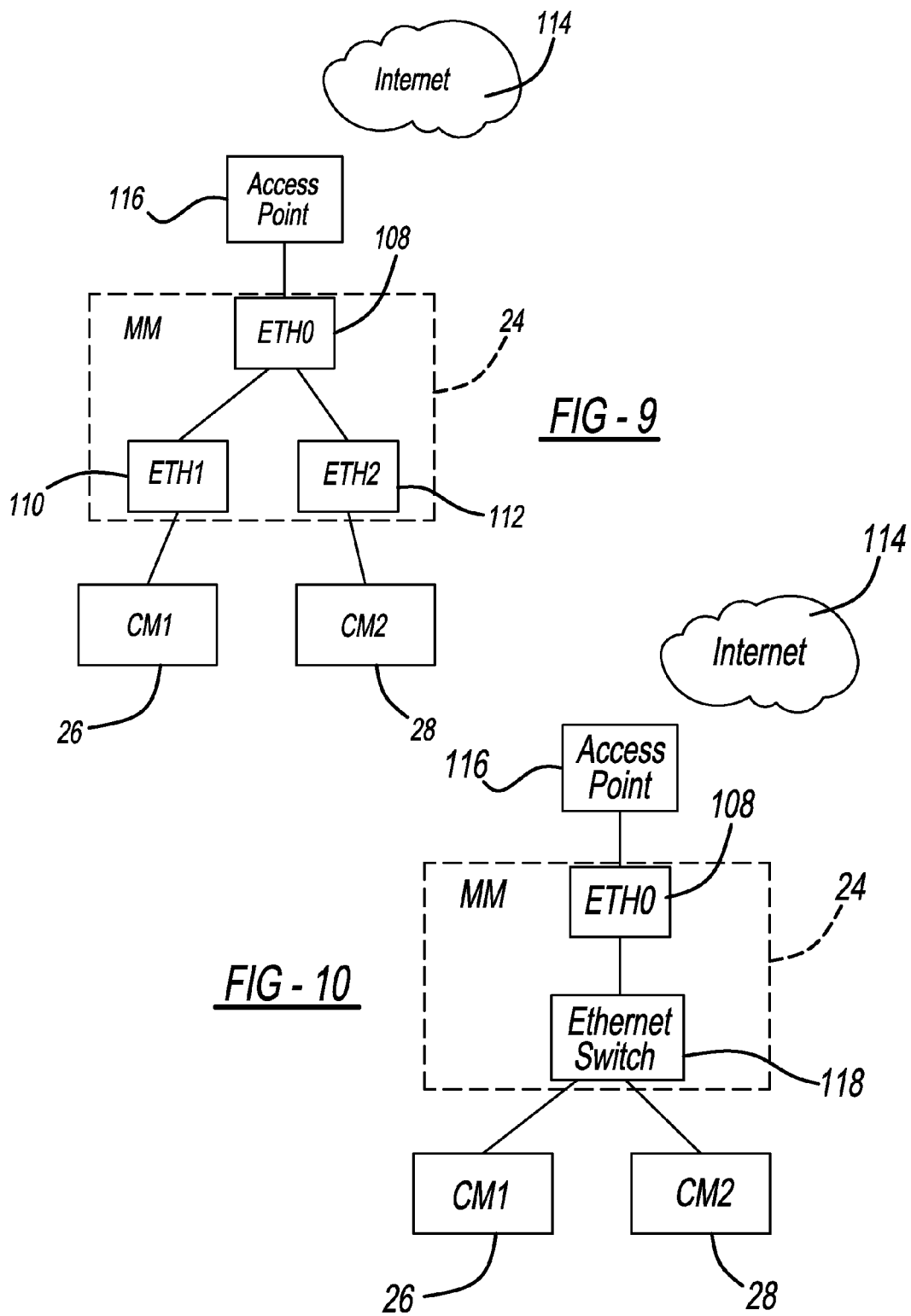

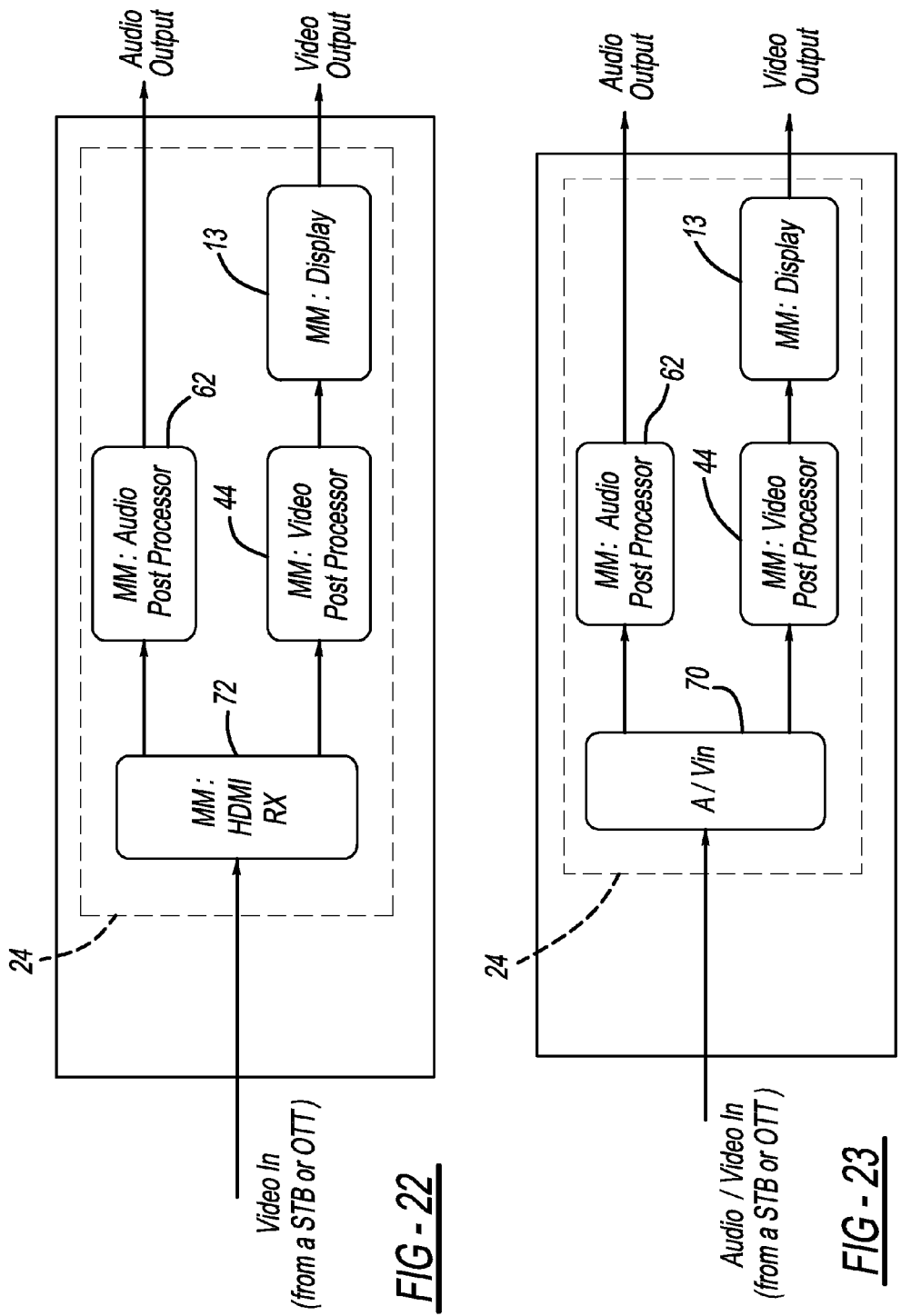

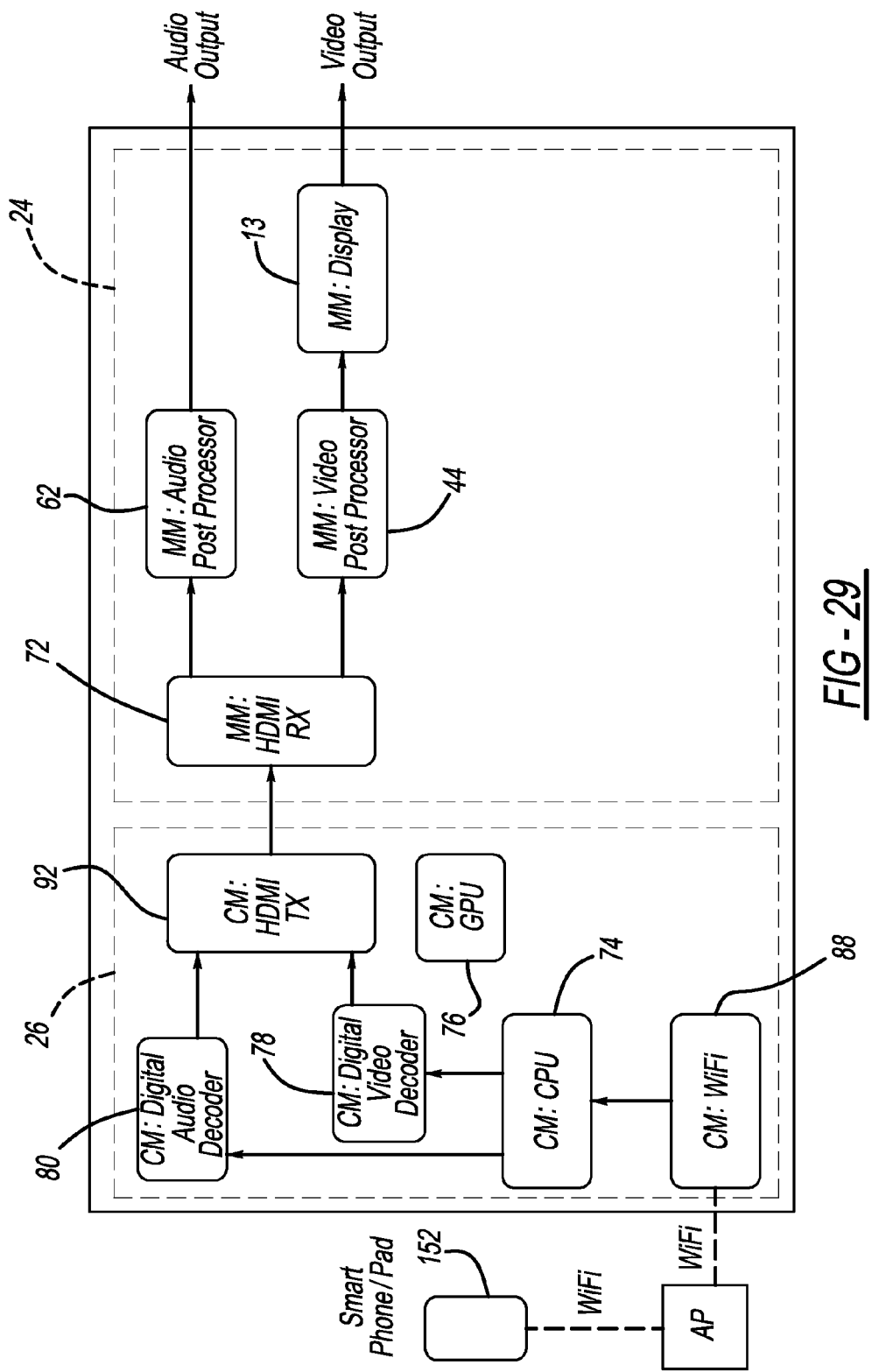

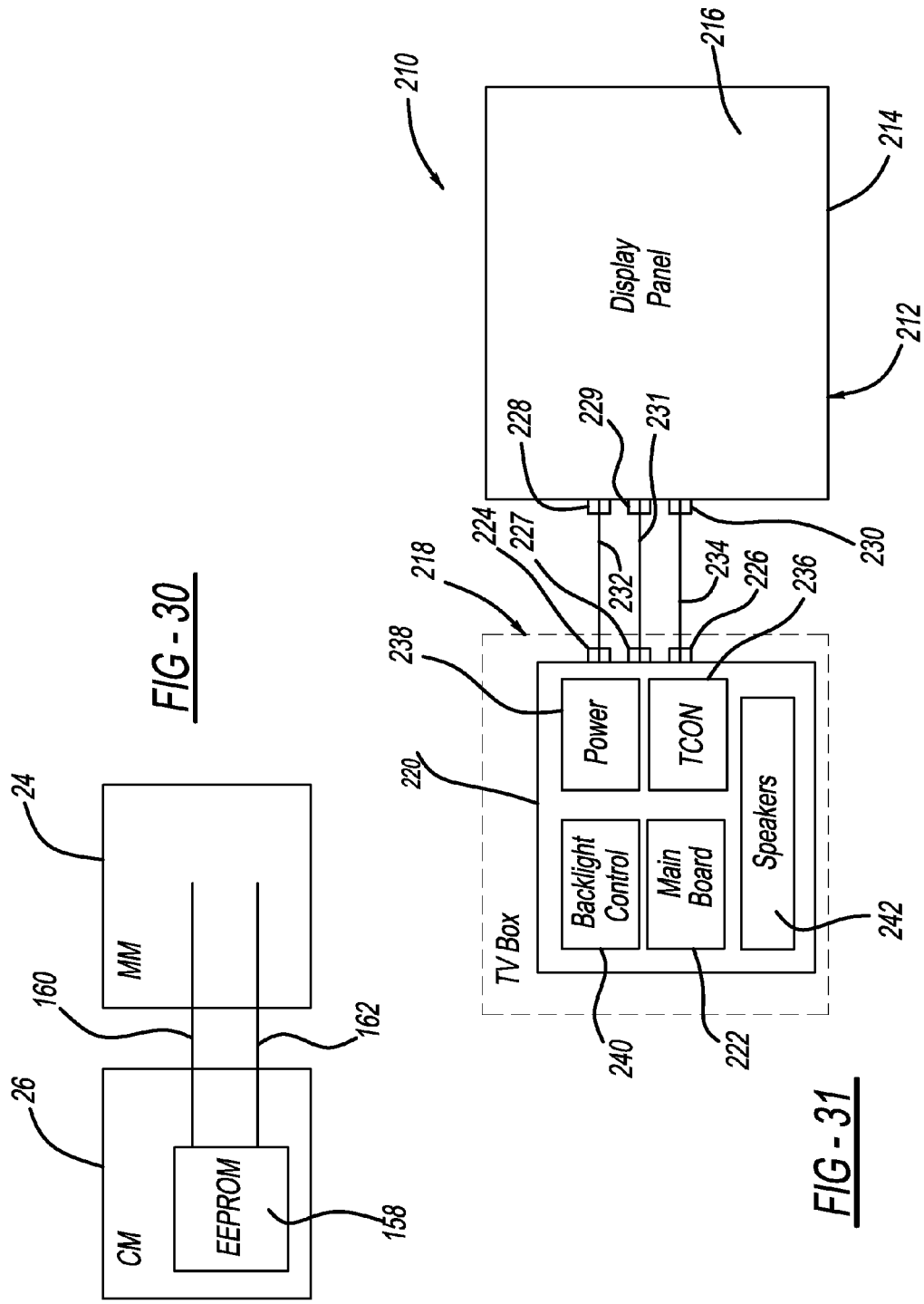

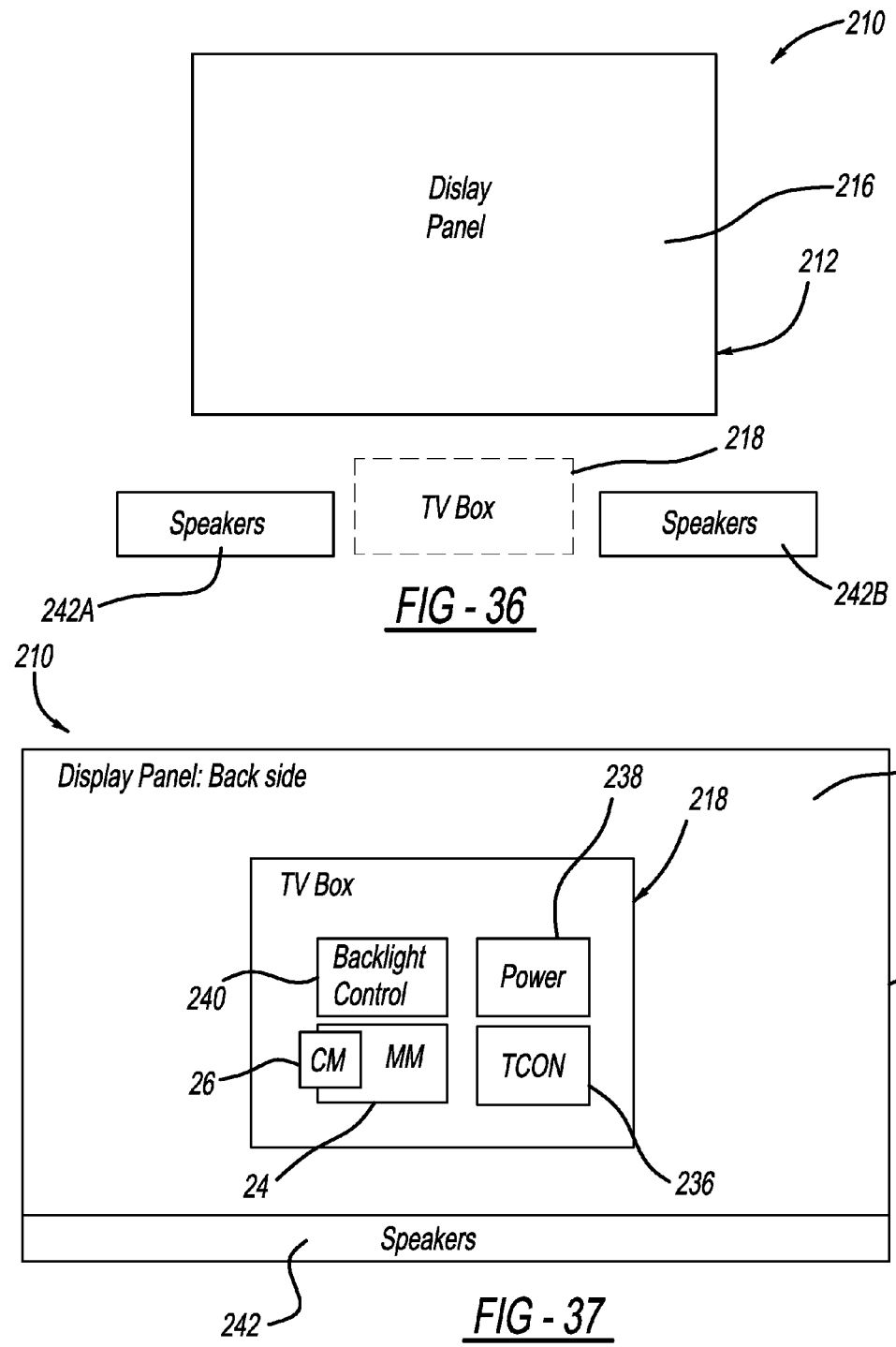

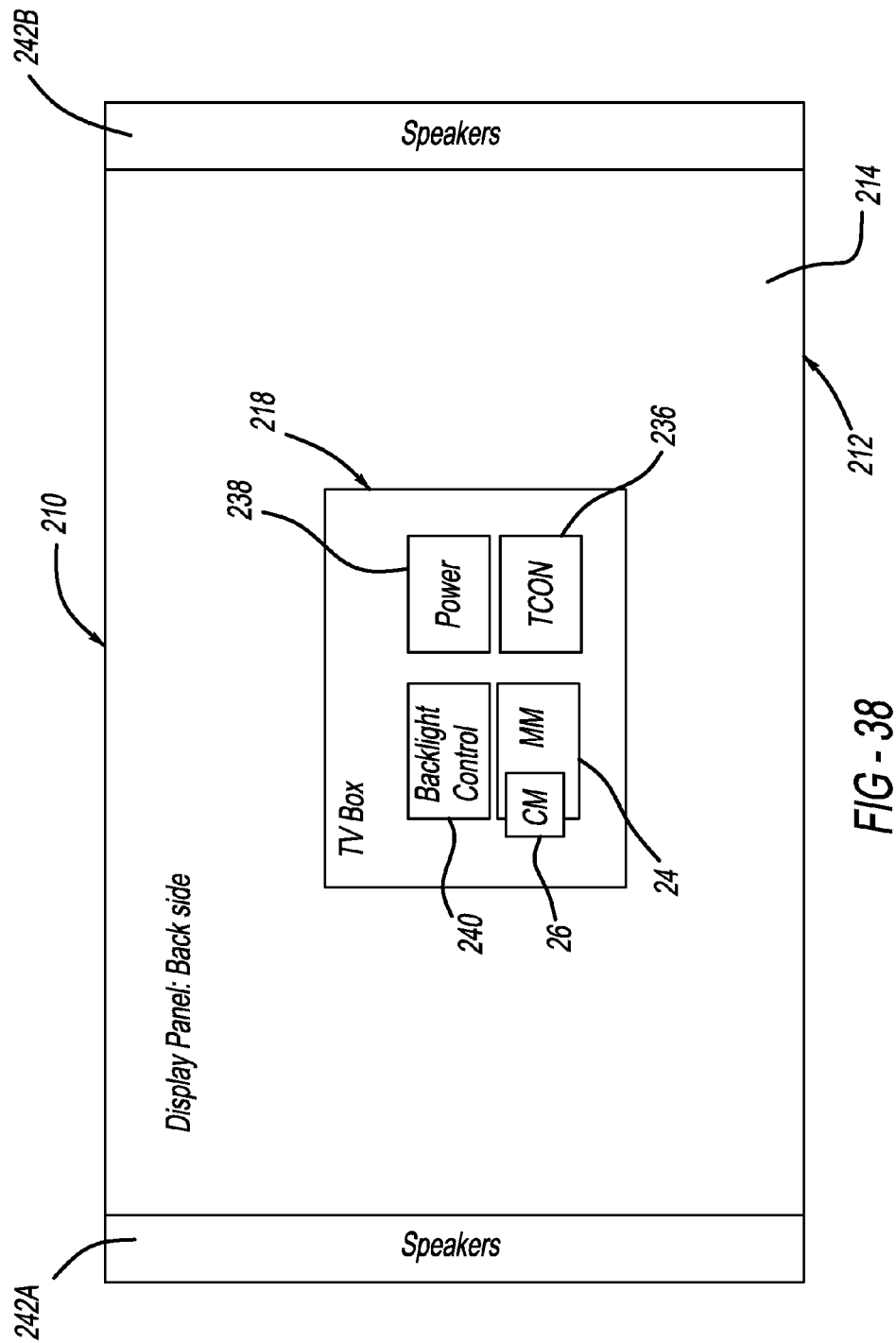

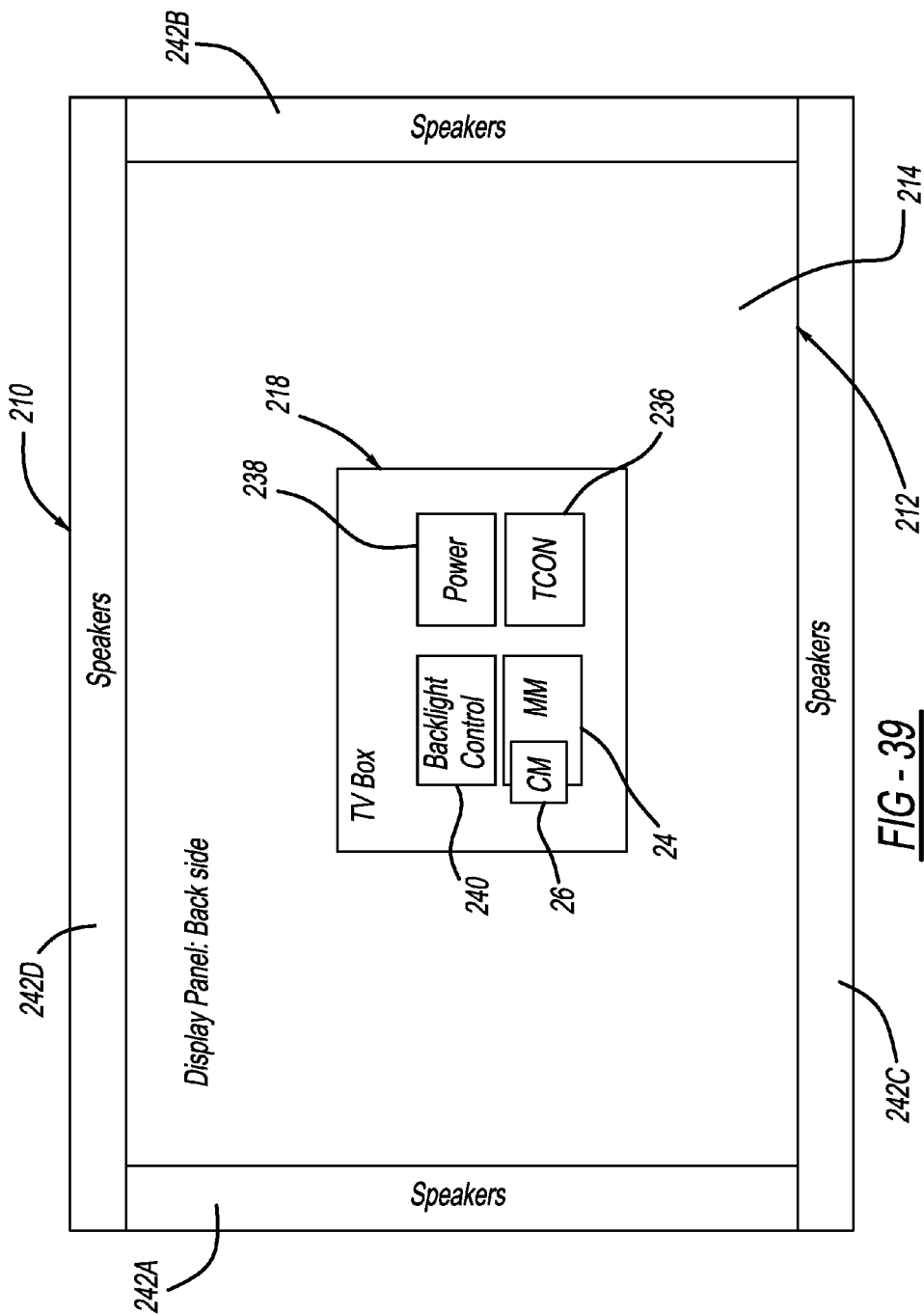

MODULAR TELEVISION SYSTEM

CROSS REFERENCE TO RELATED APPLICATIONS

This application claims priority to U.S. Provisional Patent Application 62/125,871 filed on Feb. 2, 2015 and U.S. Provisional Patent Application 62/116,831 filed on Feb. 16, 2015, both of which are hereby incorporated by reference in their entirety.

BACKGROUND

1. Field of the Invention

The invention relates to television display systems.

2. Summary of the Known Art

Initially, televisions (TVs) were capable of receiving outside programming via the use of an analog antenna. The analog antenna would receive analog signals from a transmission tower and the television system would display audio and video images on the display of the television. With the growth of cable television, cable television providers provided programming to televisions via a cable set top box. The cable set top box would receive television signals from a coaxial cable. The cable set top box would descramble these signals and provide them to the television, wherein the television would then display the audio and video images. Further improvements in televisions incorporated the use of additional electronics for "cable ready" television systems. These television systems already contain additional electronics for descrambling a cable signal, minimizing the need for a cable set top box.

However, with the advent of digital television, cable providers and others provided even more complex programming to a television using a digital set top box. The digital set top box has the capability of descrambling hundreds of channels but also had additional capabilities, such as providing on demand programming and other interactive features. Even more recently, modern television systems have integrated both an Internet connection capability combined with a high performance central processing unit and/or graphics processing unit. Many third party applications can be downloaded by the users of the television systems, including video streaming services and gaming applications.

As these video streaming services, gaming applications and other applications become more complex, more powerful processing is required by the television system. As such, central processors and graphic processors that are integrated within the television systems may become obsolete in terms of their computing capability, but the display of the television system may not obsolete in terms of the display capability. As a work around, some users utilize an over the top box or set top box in order to run updated applications. These add on devices, however, compromise the user experience, as the user now needs to operate multiple remote controls to power on the systems and to go to the desired content. Further complicating matters, each set top box or television system may have very different graphical user interfaces further compromising the user experience.

SUMMARY

A modular television system may include a main module housing. Located within the main module housing may be a main module processor, a display, and at least one computing module port. Each of the display, audio output device and computing module ports are in communication with the main module processor. The main module processor functions to present audio and video received by the main module processor.

In addition, the main module processor is configured to communicate with a removable computing module. The removable computing module is configured to connect to the computing module port of the main module. The removable computing module has a computing module processor, wherein the main module processor is configured to communicate with data from the computing module processor when presenting audio and video received by at least one of a plurality of inputs/output ports. The plurality of input/output ports are in communication with the main module processor or the computing module processor.

In another embodiment, the modular television system may include a display subsystem and a television module subsystem. The display subsystem has a housing that contains a display panel for displaying images and display subsystem port. The television module subsystem has a housing that contains a main board and a television module port in communication with the main board. The main board is located within the housing and is configured to communicate with the display subsystem via at least one cord.

The modular television system may also include a timing controller module in communication with the display panel for controlling images displayed by the display panel of the display subsystem and a backlight controller in communication with the display panel as well. The backlight controller is configured to control the backlighting of the display panel. A power supply may be located in the housing of the television module subsystem and functions to supply power to the main board of the television module subsystem and the display subsystem. The timing controller module and/or backlight controller may be located either in the housing of the television module subsystem or the housing of the display subsystem. This allows either or both the timing controller module or backlight controller to be located in the display subsystem or the television module subsystem thereby providing a modular design for the television system.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIGS. 9 and 10 illustrate an embodiment of a block diagram of different local area network and routing configurations of the main module and the computing module;

FIGS. 22 and 23 illustrate an embodiment of an application scenario utilizing a set top box;

FIG. 29 illustrates an embodiment of a process flow for a multiscreen interaction scenario;

FIG. 30 illustrates an embodiment of an storage device storing for device information of the computing module;

FIG. 31 illustrates an embodiment of a modular television system;

FIG. 36 illustrates an embodiment of a modular television system having separate speakers; and FIG. 37 through 39 illustrate an embodiment of modular television systems having speakers located at different locations.

DETAILED DESCRIPTION

Figure 1:
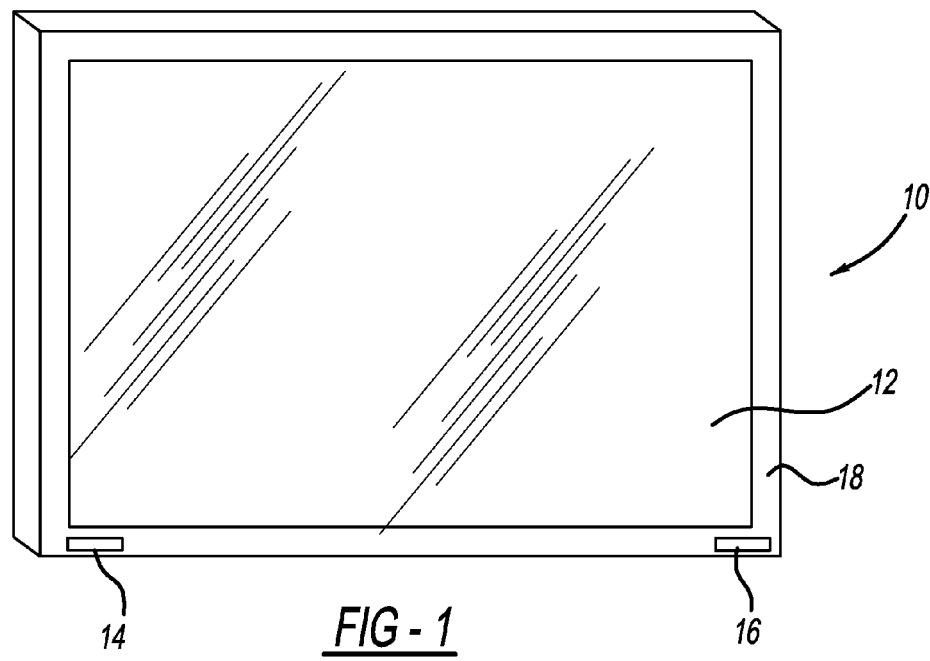
FIG. 1 illustrates an embodiment of a modular television system.

Referring now to FIG. 1, modular television system 10 is shown. The modular television system 10 has a display 12 for displaying images. The modular television system 10 may also have one or more speakers 14 and 16 integrated within a housing 18 of the modular television system 10. The speakers 14 and 16 function to provide sound from the modular television system 10. Of course, it should be understood, that any one of a number of different types or quantity of speakers may be utilized. In addition, the speakers 14 and 16 may be separate and apart from the modular television system 10.

Figure 2:
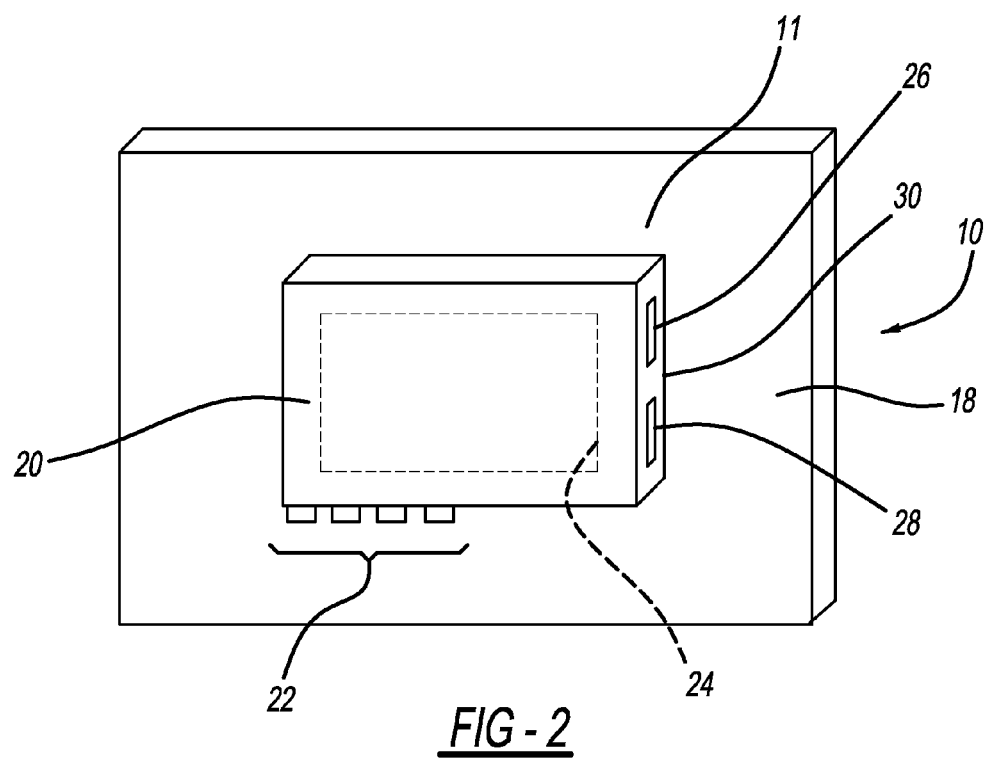
FIG. 2 illustrates a backside of the modular television system of FIG. 1.

Referring to FIG. 2, a back side 11 of the modular television system 10 is shown. Here, the housing 18 includes a portion 20 of the housing 18 that may contain electronics associated with the modular television system 10. Here, the modular television system includes a plurality of input/output ports 22.

Located within the portion 20 of the housing 18 is a main module 24. As will be explained later, the main module 24 has a main module processor that is in communication with the plurality of the input/output ports 22. The plurality of input/output ports 22 may include any one of a number of different ports. For embodiment, the plurality of input/output ports could include universal serial bus (USB) ports, high definition multimedia interface (HDMI) ports, Ethernet ports, coaxial cable ports, digital video ports, video graphics array (VGA) ports, and the like. Additionally or alternatively, the input/output ports 22 could include any one of a number of different wireless interfaces such as Wi-Fi or Bluetooth interfaces.

Figure 3:
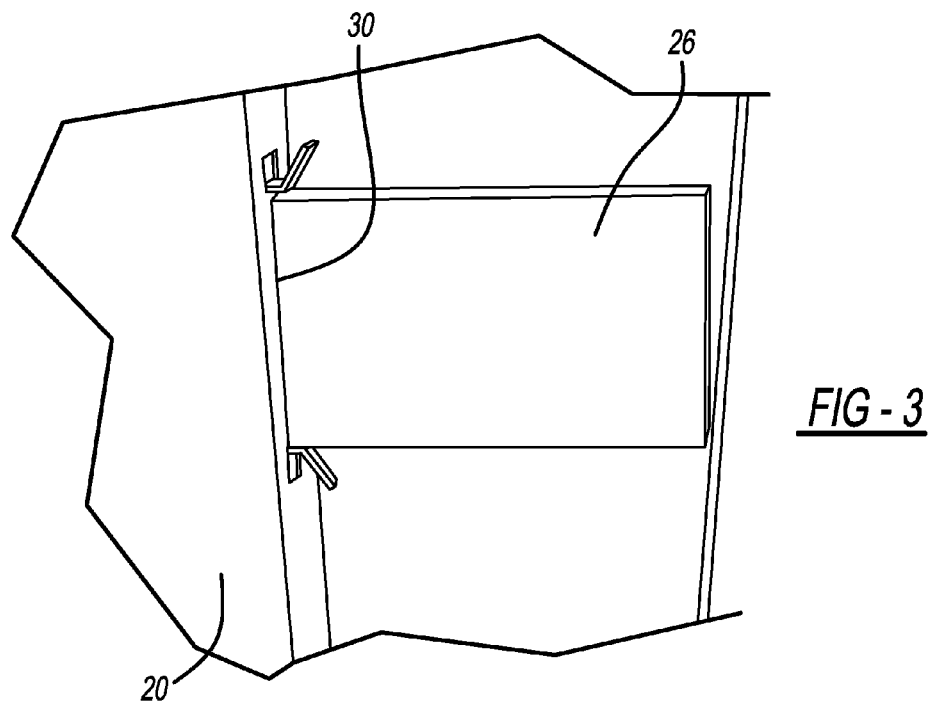
FIG. 3 illustrates the backside of the modular television system of FIG. 1, with a computing module being either inserted or removed from the modular television system.

Also in communication with the main module 24 are removable computing modules 26 and 28 that are in communication with the main module 24 via a connector, which will be described in more detail later. As best shown in FIG. 3, the computing module 26 can slide into an opening 30 of the portion 20 of the housing 18.

Figure 4:
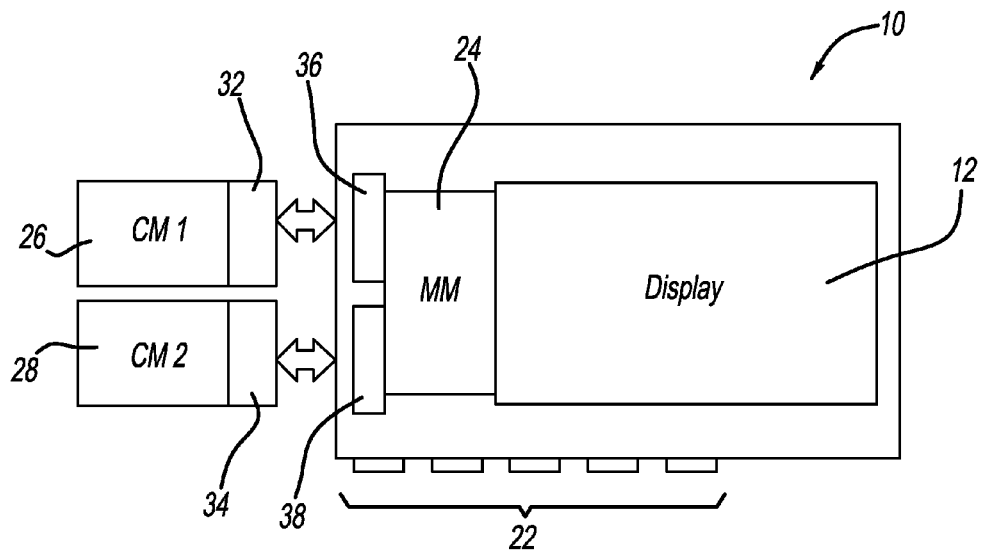
FIG. 4 illustrates an embodiment of a block diagram of the modular television system.

Referring to FIG. 4, a block diagram view of the modular television system 10 is shown. Here, the computing modules 26 and 28 each have computing module ports 32 and 34. The computing module ports 32 and 34 are configured to mate with main module ports 36 and 38, respectively. The computing module ports 32 and 34 are in communication with processors found on the computing modules 26 or 28, while the main module ports 36 and 38 are in communication with processors on the main module 24. When computing module port 32 is connected to main module port 36, this places the processors of computing module 26 in communication with the main module 24. In a like manner, when computing module port 34 is connected to main module port 38, computing module 28 is placed in communication with the processors of the main module 24.

In this embodiment, the main module 24 is in direct communication with the ports 22 and the display 12. The main module 24 can control what is displayed on the display 12 as well as receive inputs or transmit outputs to or from the ports 22. When the computing modules 26 and/or 28 are connected to the main module 24 via the ports 32, 34, 36, and 38, this allows the computing modules 26 and 28 to interact with the ports 22 as well as control what is displayed on the display 12. The main module 24 may be in charge of presenting audio and video on the display 12 in viewing conditions and may bear the function of image and audio post processing as well as be in charge of television receiving in network connections.

The computing modules 26 and/or 28 may be in charge of digital multimedia decoding of various formats and execution of various applications. For these reasons, the computing modules 26 and/or 28 may have a more powerful central processor or graphic processor to power modern operating systems, such as Linux, Android, and iOS and others. By making the computing modules 26 and/or 28 separate from the main modules 24, one can update the modular television system 10 by simply unplugging an older computing module and replacing with a newer and more powerful computing module. This allows the user to retain the display 12 which may still be current enough to date, but replace and upgrade the computing power providing audio and video images to the display 12.

Figure 5:
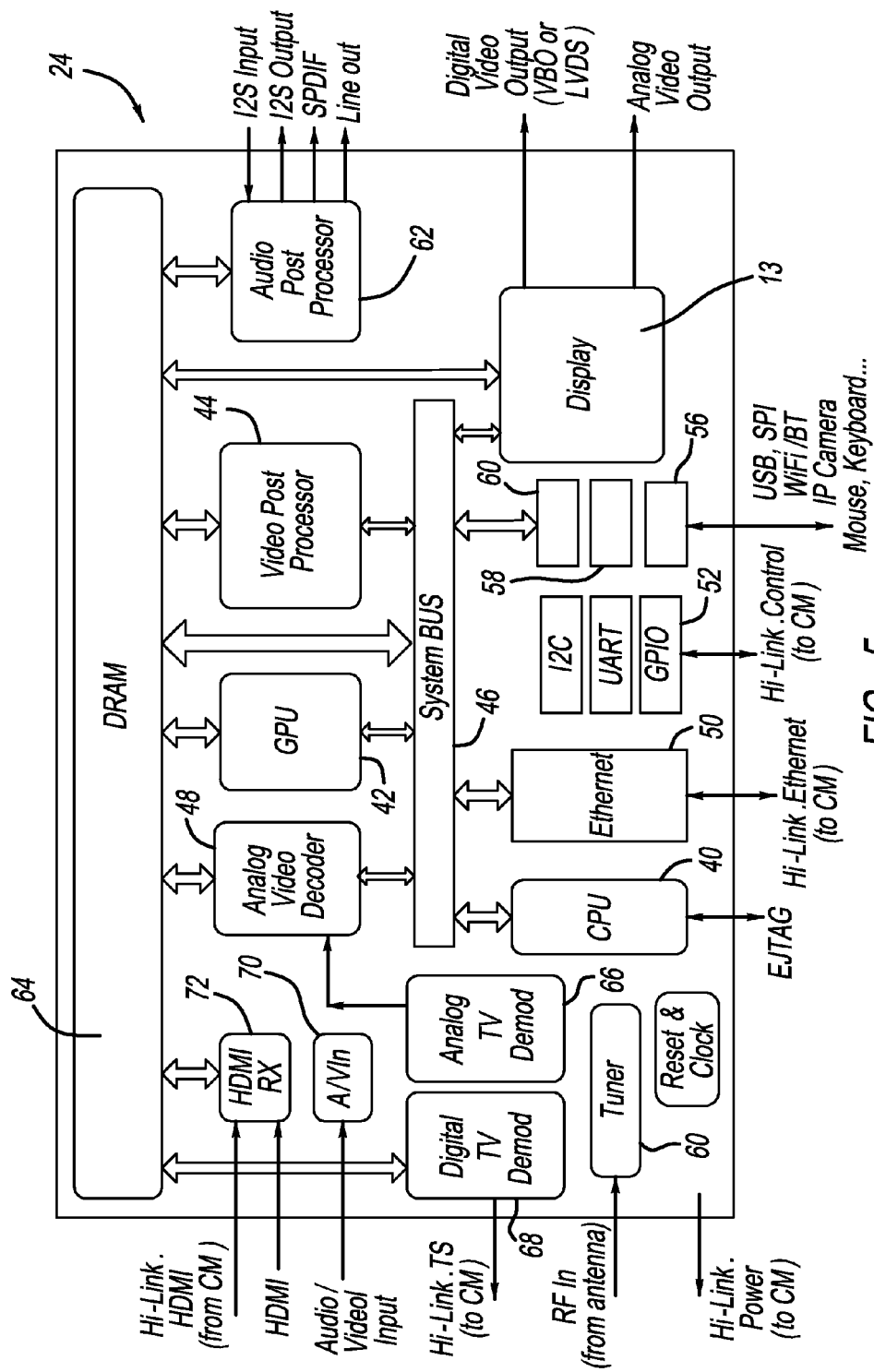
FIG. 5 illustrates an embodiment of a block diagram of a main module.

Referring to FIG. 5, a more detailed view of the main module 24 is shown. The main module 24 may include one or more processors. For example, the main module 24 may include a central processor 40, a graphics processor 42 and a video post processor 44. These processors 40, 42, and 44 communicate with each other via a system bus 46.

Also in communication with the system bus 46 may be an analog video decoder 48, an Ethernet interface 50, a control interface 52 and the display processor 13. The display processor 13 provides signals to present on the display 12. The control interface 52 may include an I2C, a UART, and/or a GPIO interface. There may also be additional interfaces 56, 58, and 60 that may be in communication with the system bus 46. These additional interfaces 56, 58 and/or 60 may include USB, a serial peripheral interface, a wireless Wi-Fi interface, a wireless Bluetooth interface, camera interface or other input/output device interfaces, such as a mouse or keyboard. In addition to video, there may also be an audio post processor 62. Memory for connecting with these various processors and interfaces may be in the form of a dynamic random access memory 64 as in communication with the system bus 46. By so doing, the devices previously described have access to the memory 64 via the bus 46.

The main module 24 may also include other more traditional television components as well. For example, main module 24 may include a tuner 66 for receiving radio frequencies from an incoming antenna. The main module 24 may also include an analog TV demodulator 66 and/or a digital TV demodulator 68. The analog TV demodulator 66 may be communication with the analog video decoder 48 or the memory 64, while the digital TV demodulator 68 may be in communication with the memory 64. In addition, the main module 24 may have an audio/video input 70 as well as a HDMI receiver 72.

Several of the interfaces of the main module 24 may also be placed in communication with the computing modules 26 and 28. For example, the HDMI receiver 72, digital TV demodulator 68 and/or analog TV demodulator 66, processor 40, Ethernet interface 50, control interface 52, may all or in some part be placed in communication with the computing module 26 and/or 28.

Figure 6:
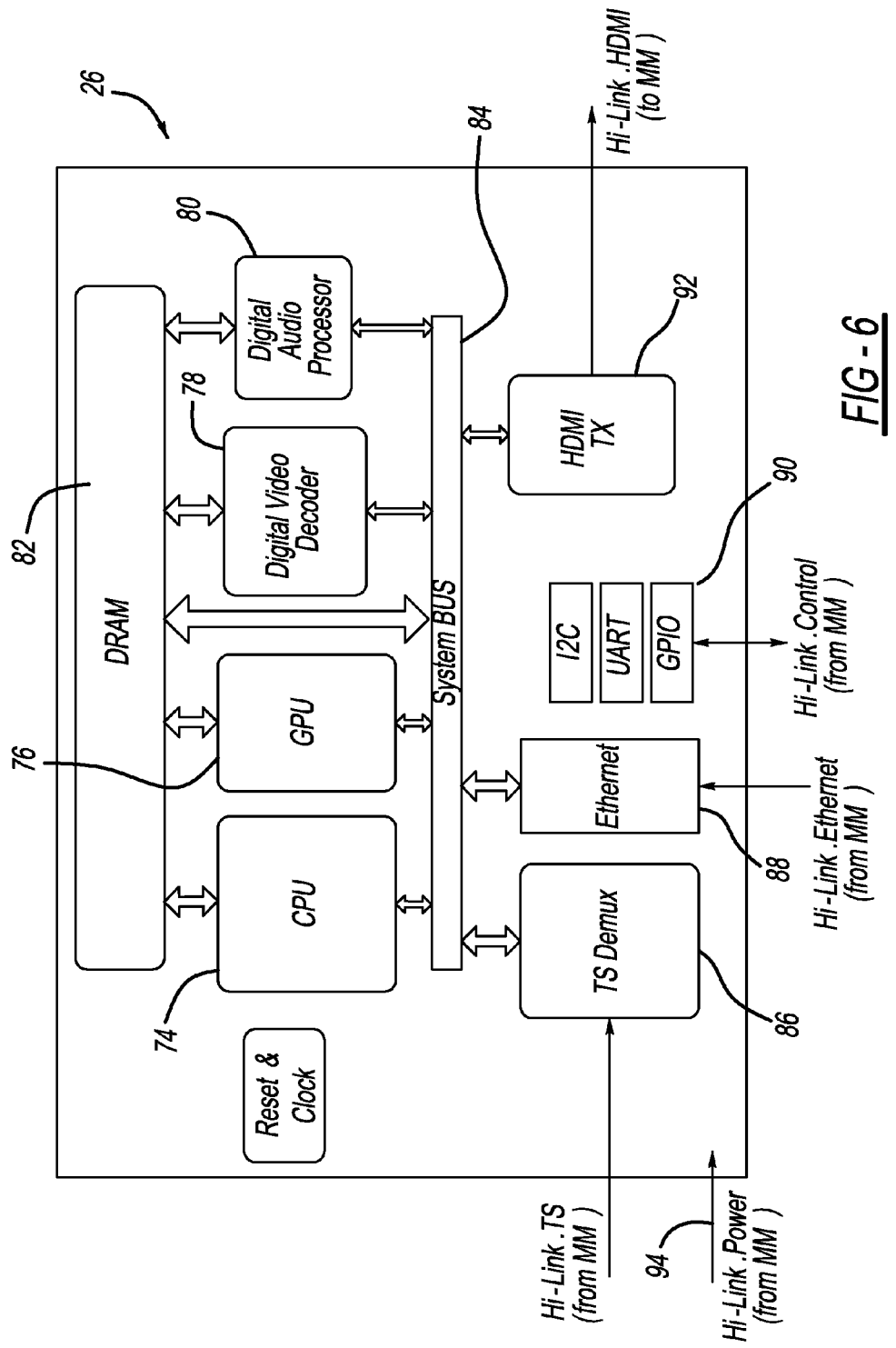
FIG. 6 illustrates an embodiment of a block diagram of the computing module.

Referring to FIG. 6, a more detailed view of the computing module 26 is shown. As it should be understood, a description regarding the computing module 26 is equally applicable to the computing module 28. Here, the computing module 26 has a central processor 74, a graphics processor 76, a digital video decoder 78, and a digital audio processor 80. Each of the central processor 74, graphics processor 76, digital video decoder 78, and digital audio processor 80 are in communication with a dynamic random access memory 82 as well as a system bus 84. In addition, the computing module 26 may include a transport stream demultiplexer 86, an Ethernet interface 88, a control interface 90, and a HDMI transmitter 92. Each of these devices may be in communication with the system bus 84.

Power is provided to the computing module 26 from a power input 94 that receives power from the main module 24. The control interface 90 may include an I2C, UART, and/or GPIO interface. The transport stream demultiplexer 86, control interface 90, and HDMI transmitter 92 may all be in direct connection with the main module 24 via the port 32. The central processor 74 and/or graphics processor 76 of the computing module 26 may offer assistance to displaying images and providing video to the user of the main module 24.

For example, the main module 24 may be responsible for analog video receiving and decoding, digital video receiving and demodulation, ultra high definition image processing, which may include noise reduction, super resolution scaling, sharpening, dynamic range enhancement, color and skin tone adjustment, deinterlacing, microdimming and backlight control, among others. In addition, the main module 24 may be responsible for high definition multimedia interface reception, universal serial bus interfacing, as well as wireless interfacing such as Wi-Fi or Bluetooth. Further, the main module 24 may also be responsible for Ethernet in providing a network connection to computing module 26.

The computing module 26 may, for example, be responsible for ultrahigh definition digital video recording, transport stream demultiplexing for digital television decoding, digital multimedia decoding, providing a high quality graphical user interface of the user of the system 10, and allow for the downloading and execution of third party applications such as video streaming or gaming.

The interfacing between the ports 32 and 36 and ports 34 and 38, best shown in FIG. 4, can take any one of a number of different forms. In one embodiment, the following table shows a 58 pin interface.

| Pin# | Pin definition | Notes |
| --- | --- | --- |
| 1 | GND | GND |
| 2 | HDMI3_HPDIN | HDMI |
| 3 | HDMI-5V | |
| 4 | HDMI3_CLKN | |
| 5 | GND | |
| 6 | HDMI3_CLKP | |
| 7 | HDMI3_RX0N | |
| 8 | GND | |
| 9 | HDMI3_RX0P | |
| 10 | HDMI3_RX1N | |
| 11 | GND | |
| 12 | HDMI3_RX1P | |
| 13 | HDMI3_RX2N | |
| 14 | GND | |
| 17 | GND | |
| 18 | HDMI3_SCL | |
| 19 | GND | GND |
| 20 | GPIO | CM awakening |
| 21 | GPIO3 | Power-off ready notification from CM to MM |
| 22 | CMA | CM Selection |
| 23 | GND | GND |
| 24 | PLUG DETECT | Plug/unplug detection |
| 25 | GND | |
| 26 | NET_TXN | Gigabit Ethernet |
| 27 | NET_TXP | |
| 28 | GND | |
| 29 | NET_RXN | |

-continued

| Pin# | Pin definition | Notes |
|---|---|---|
| 30 | NET_RXP | |
| 31 | GND | |
| 32 | NET_ND3 | |
| 33 | NET_PD3 | |
| 34 | GND | |
| 37 | GND | GND |
| 38 | SDA | Hand shaking |
| 39 | SCL | |
| 40 | GND | GND |
| 41 | TS_CLK | TS |
| 42 | TS_SYNC | |
| 43 | TS_VLD | |
| 44 | TS_D7 | |
| 45 | TS_D6 | |
| 46 | TS_D5 | |
| 47 | TS_D4 | |
| 48 | TS_D3 | |
| 49 | TS_D2 | |
| 50 | TS_D1 | |
| 51 | TS_D0 | |
| 52 | GND | GND |
| 53 | 12V/2A | POWER |
| 54 | 12V/2A | |
| 55 | GND | GND |
| 56 | UART_RX | Hand shaking |
| 57 | UART_TX | |
| 58 | GND | GND |

In this embodiment, pins 53 and 54 provide power to the computing module 26 from the main module 24. Pins 2-18 transmit video and audio signals from the computing module 26 to the main module 24. Pins 26-33 provide an Ethernet link that forms a local area network for the whole system of the main module 24 and the computing module 26. Internet data is passed through this link and is also used to share peripheral devices between the main module 24 and the computing module 26. Pins 41-51 provide a transport stream link from the main module 24 to the computing module 26 in the case of a digital television signal receiving and decoding. Pin 22 is utilized to identify the computing modules, up to two computing modules if only one pin is used and up to four computing modules if there are two pins utilized. Additional computing modules can be identified if additional pins are utilized on the interface. Pins 20, 21, 39, 56, and 57 transmit handshaking and/or control information between the main module 24 and a computing module 26.

Of course, it should be understood that the arrangement and the number of pins can vary according to product requirement. Furthermore, grounding pins are used to prevent interference between signals. It should further be understood that the type of connector utilized by the interface can vary as required by application.

Figure 7:
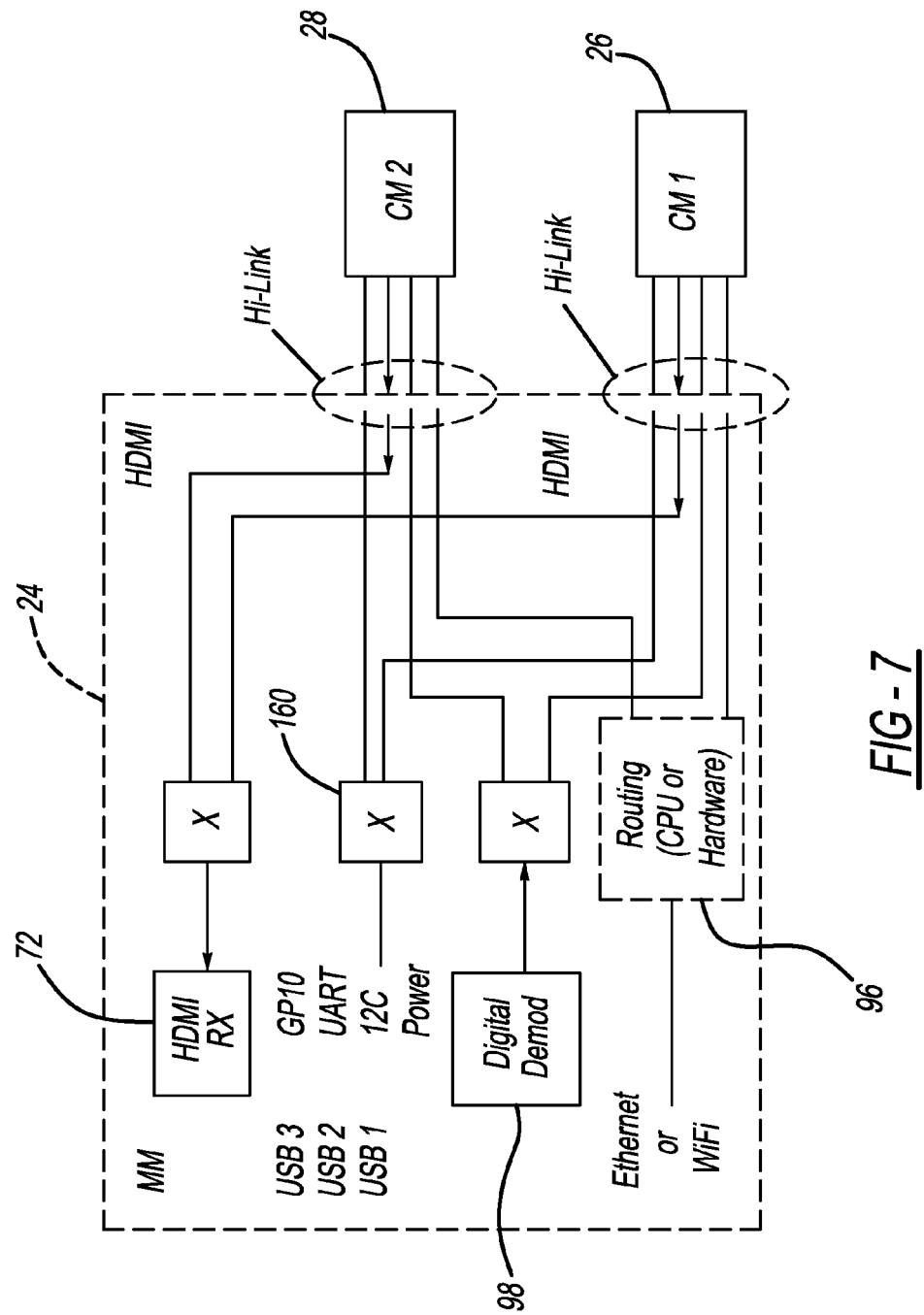
FIG. 7 illustrates an embodiment of a block diagram of a general connection routing between the computing module and the main module.

FIG. 7 illustrates an embodiment of a block diagram of a general connection routing between the computing modules 26 and 28 and the main module 24. Here, it is shown that both computing modules 26 and 28 are in communication with a routing block 96 that connects the computing modules 26 and 28 to Ethernet or Wi-Fi. Further, the computing modules 26 and 28 are connected to a digital demodulation block 98. In addition, the computing modules 26 and 28 are connected to other various communication systems such as GPIO, UART, I2C, and power of the main module 24 by block 100. Further, the computing modules 26 and 28 are connected to the HDMI interface 72 of the main module 24 as well. As such, the computing modules 26 and 28 can have access to any of the devices or interfaces located on the main module 24. This can include any one of the plurality of ports 22, shown in FIG. 4, such as USB, serial peripheral interface, wireless interfaces, or access to other input devices such as a mouse or keyboard that are connected to the main module 24.

Figure 8:
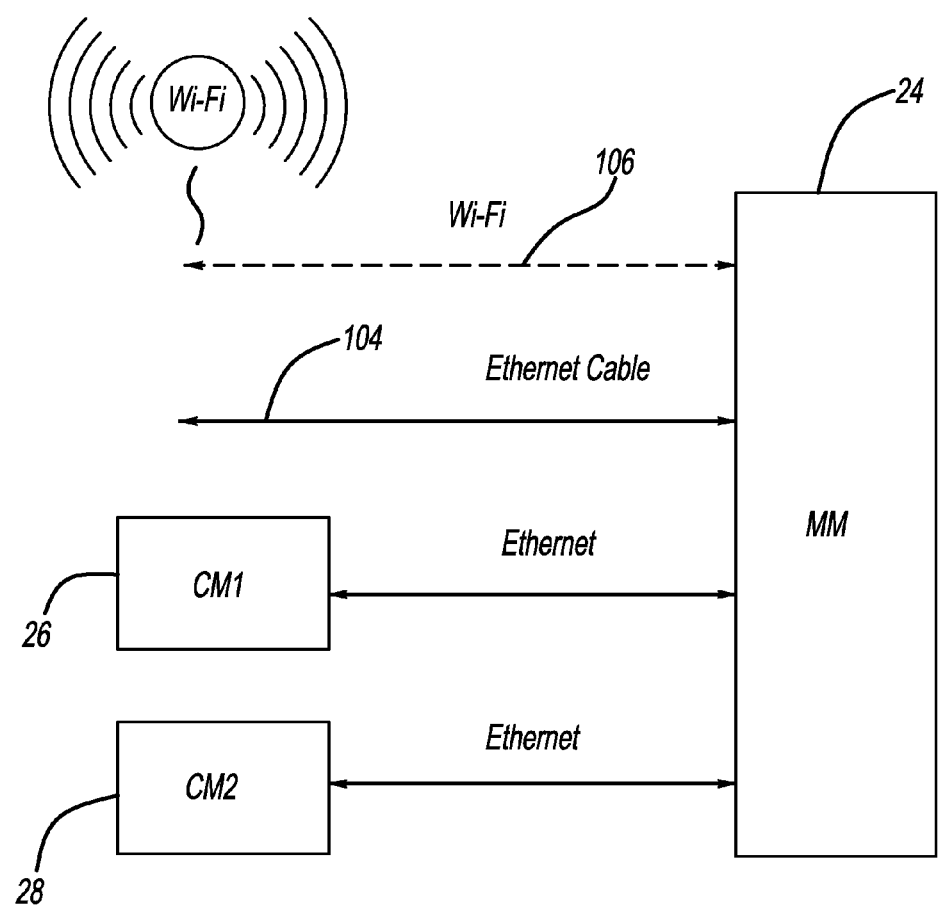
FIG. 8 illustrates an embodiment of a block diagram illustrating network access provided to the computing modules via the main module.

Referring to FIG. 8, an embodiment of a block diagram illustrating network access provided to the computing modules 26 and 28 via the main module 24 is shown. Here, the computing modules 26 and 28 are connected to the main module 24 via ports 32, 34, 36, and 38, best shown in FIG. 4. The main module 24 is connected to the Internet either via an Ethernet cable 104 or via a Wi-Fi connection 106. Ethernet cable 104 and/or Wi-Fi connection 106 allows the main module 24 to communicate with the Internet. Because the computing modules 26 and 28 are both connected to the main module 24, Internet access to the computing modules 26 and 28 can be provided.

A local area network is formed in the main module 24 and the computing modules 26 and 28 through an Ethernet hub with routing capability. The routing hub can be realized by central processor software or by a hardware accelerator. In this case, the computing modules 26 and 28 do not have to have network access that is independent of the main module 24. The local area network not only allows network connection for both the main module 24 and the computing modules 26 and 28, but also allows device sharing as will be described later in this application. Of course, it should be understood, that the computing modules 26 and/or 28 may also be configured with a Wi-Fi or Ethernet interface allowing the computing modules 26 and/or 28 to communicate directly with the Internet instead of interfacing with the main module 24. In this configuration, Internet access to the main module 24 could be provided by interfacing with the computing modules 26 and/or 28, if they are configured to be directly connected to the Internet.

Referring to FIGS. 9 and 10, block diagram of an embodiment of different local area network and routing configurations of the main module 24 and the computing modules 26 and 28 is shown. In FIG. 9, the main module 24 has three separate Ethernet interfaces 108, 110, and 112. Interfaces 110 and 112 are connected to computing modules 26 and 28, respectively. The interfaces 110 and 112 are also both connected to interface 108. Here, the interfaces 110 and 112 connect to the Internet 114 via an access point 116 which has been in direct communication with the Ethernet interface 108.

FIG. 10 illustrates an alternative solution. In FIG. 10, interfaces 110 and 112 have been replaced with an Ethernet switch 118 that is connected to the computing modules 26 and 28 and also the Ethernet interface 108. The computing modules 26 and 28 connect to the Ethernet switch 118 first and then the computing modules 26 and 28 then connect to the Internet 114 via the Ethernet interface 108. Regardless of which methodology is utilized, data routing between the main module 24 and the computing modules 26 and 28 can be assisted by the central processor or a hardware accelerator if necessary.

Figure 11:
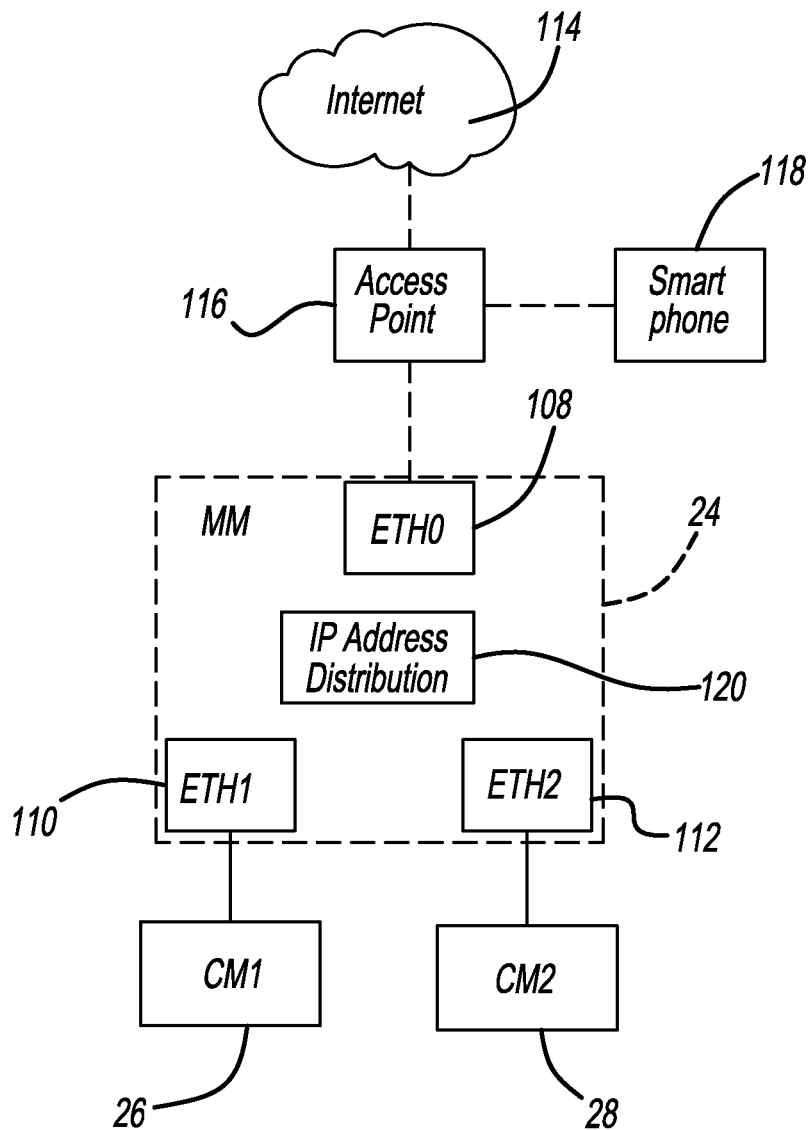
FIG. 11 illustrates an embodiment of a block diagram of a system having the main module and computing modules utilizing Internet protocol address distribution.

Referring to FIG. 11, the block diagram of an embodiment of the system having the main module 24, and computing modules 26 and 28 is shown, wherein Internet protocol (IP) address distribution is shown. In this configuration, the main module 24 has Ethernet interfaces 110, 112, and 108 as previously described in FIG. 9. It should also be understood that the configuration shown in FIG. 10 is equally applicable to the Internet protocol address distribution methodology that will be described.

There are some application scenarios where another device, such as a smart phone 118, is connected to the same access point 116 as the main module 24 and desires to discover the computing modules 26 and/or 28. This may arise in the case of multiscreen applications that will be later described in this specification.

This function can be realized by adding a block 120 for IP address distribution. In this case, the main module 24 is assigned an IP address by the access point 116. Another device, such as a smart phone 118 is also connected to the access point 116. The IP address distribution block 120 will produce virtual IP addresses for the computing modules 26 and/or 28 so that the computing modules 26 and/or 28 would appear as if they are in the same network as both the main module 24 and the smart phone 118, instead of just being a subnetwork of the main module 24. The IP address distribution block 120 can be a hardware accelerator or software solution running on any one of the processors of the main module 24.

Figure 12:
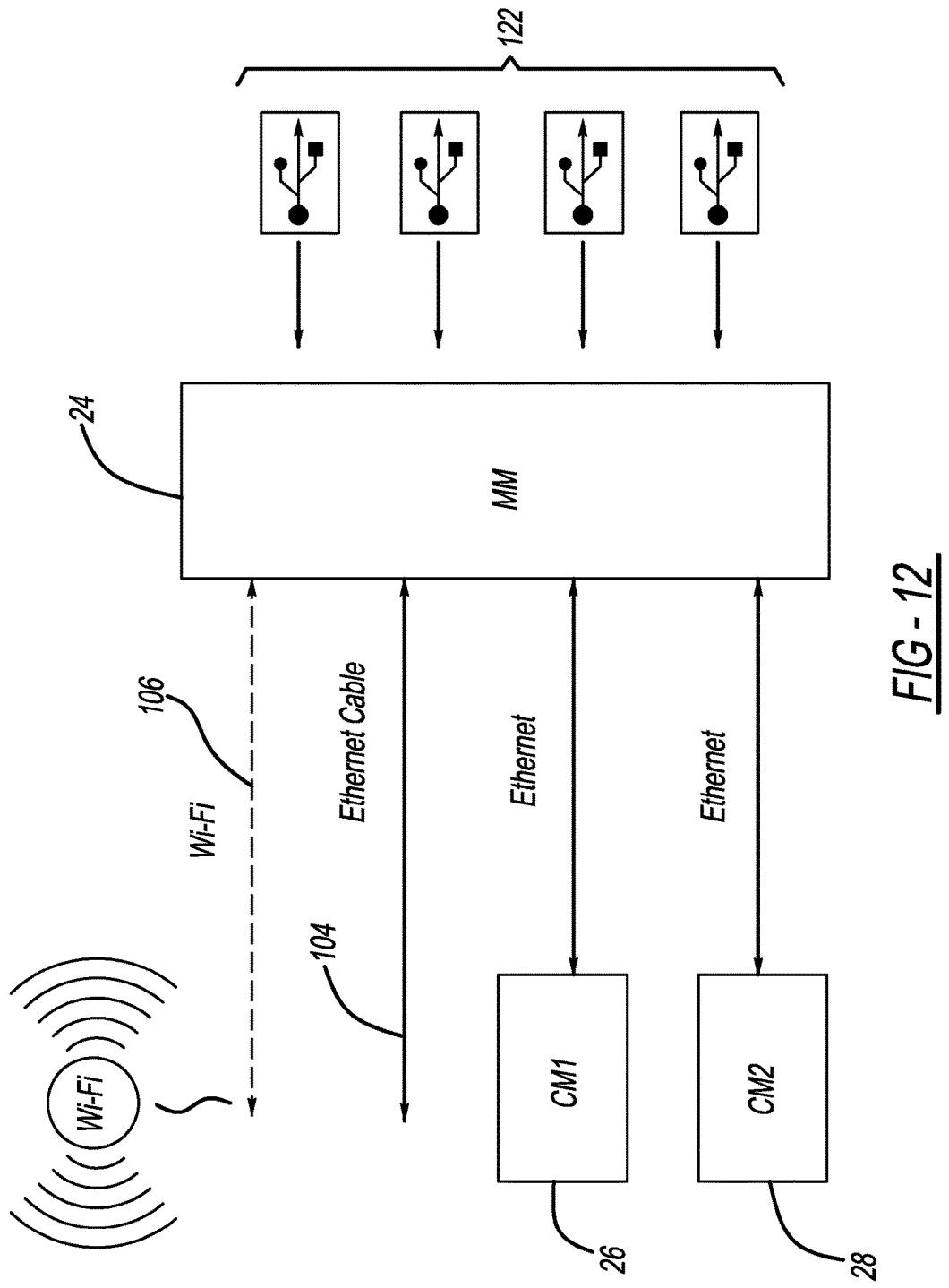
FIG. 12 illustrates an embodiment of a block diagram for sharing devices with the computing modules via the main module.

Referring to FIG. 12, an embodiment of a methodology for sharing devices with the computing modules 26 and 28 via the main module 24 is shown. In the embodiment that the main module 24 provides Internet access to the computing modules 26 and 28 via an Ethernet cable 104 or a wireless Internet interface 106, peripheral devices 122 may also be able to communicate with the computing modules 26 and 28 via the main module 24. As such, the main module 24 may have any one of a number of different ports, such as universal serial bus ports. Peripheral devices, such as cameras, flash drives, keyboards/mouse are physically plugged into the main module 24. These devices are also made visible and useable to the computing modules 26 and 28 through the over-the-network technology.

One methodology for device sharing can be implemented by first defining a private protocol. In this case, the main module 24 interprets data from the devices 122 and packages the data with a header containing the main module interpreted information, such as device type, data type, and length. The package data is sent to one or all of the computing modules 26 and/or 28 over the Ethernet. The computing modules 26 and 28 are configured to understand the packaged data format. One possible way of implementing this is to add a virtual device driver to the kennel of the computing modules 26 and 28. The advantage of this private protocol is that performance is good since device data is may only be interpreted once at the main module 24.

Another methodology for device sharing utilizes a standard protocol. In this situation, a USB device is interpreted by the main module 24 and is packaged as USB data and sent to one of the computing modules 26 or 28 over the Ethernet connection between the main module 24 and the computing modules 26 or 28 in the form of Internet protocol packets. In virtual software, a USB driver is running on the computing modules 26 or 28. The computing module 26 or 28 would assemble the Internet protocol packets and would see the data as USB data and would see the USB device as if it's plugged into the computing module 26 or 28 itself. This methodology has the advantage in that the computing module 26 or 28 would see the USB devices as if they are plugged into the computing module itself although they are actually plugged into the main module 24.

Figure 13:
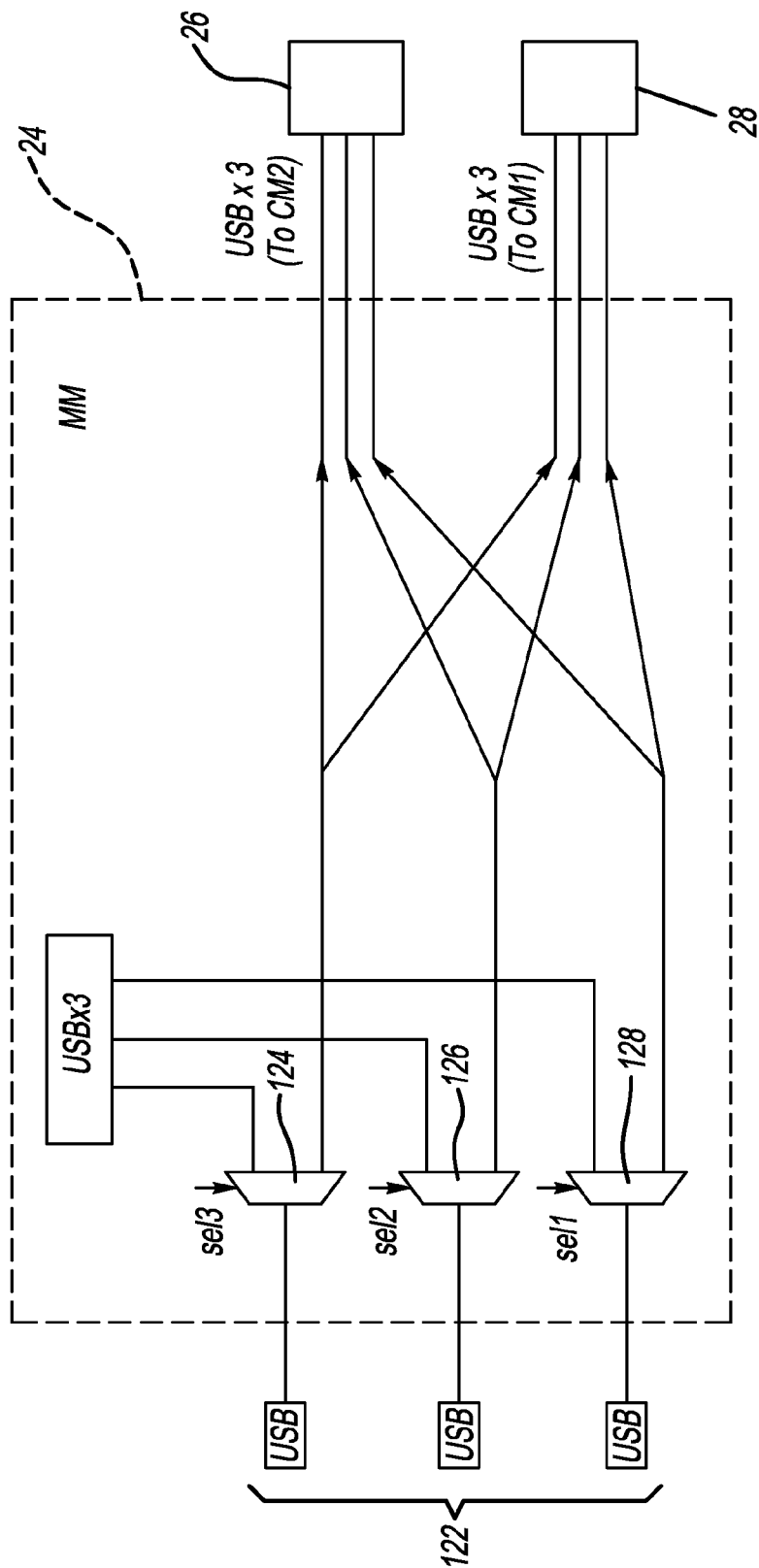
FIG. 13 illustrates an embodiment of a block diagram of another methodology for sharing devices with the computing modules via the main module.

Referring to FIG. 13, another methodology for device sharing is shown. Here, the USB devices 122 are plugged into the USB interfaces of the main module 24. Switches 124, 126, and 128 are utilized to assign a USB device to one of the main module 24 and the computing modules 26 and 28. If such a methodology is utilized, the connection between the computing modules 26 and 28 and the main module 24 would include pins providing USB links, which can be as many in number of USB devices plugged into the system. Once the USB device is assigned/switched to one of the main module 24 and computing modules 26 and 28, only the designated main module 24 or computing module 26 or 28 can see/use the USB device exclusively.

Figure 14:
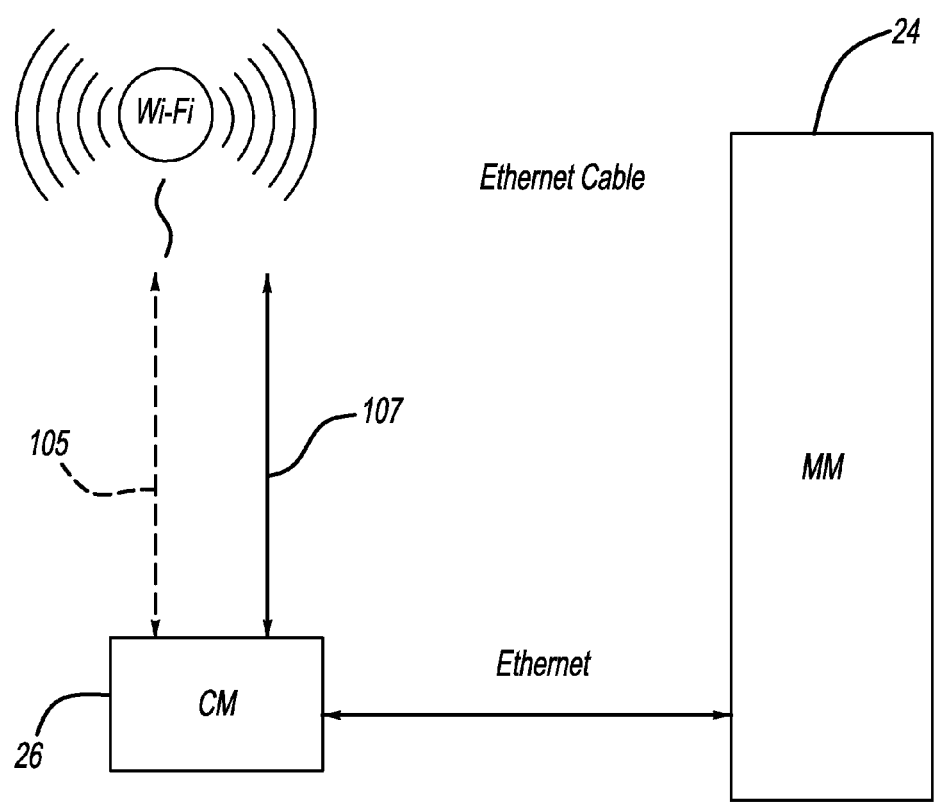
FIG. 14 illustrates an embodiment of a block diagram wherein network access is provided to the main module via the computing module.

Referring to FIG. 14, a block diagram illustrating an embodiment of network access provided to the main module 24 via the computing module 26 is shown. Here, the computing module 26 (and/or 28) is connected to the main module 24 via ports 32, 34, 36, and 38, best shown in FIG. 4. The computing module 26 is connected to the Internet either via an Ethernet cable 107 or via a Wi-Fi connection 105. Ethernet cable 107 and/or Wi-Fi connection 105 allows the computing module 26 to communicate with the Internet. Because the main module 24 is connected to the computing module 26, Internet access to the main module 24 can be provided.

Figure 15:
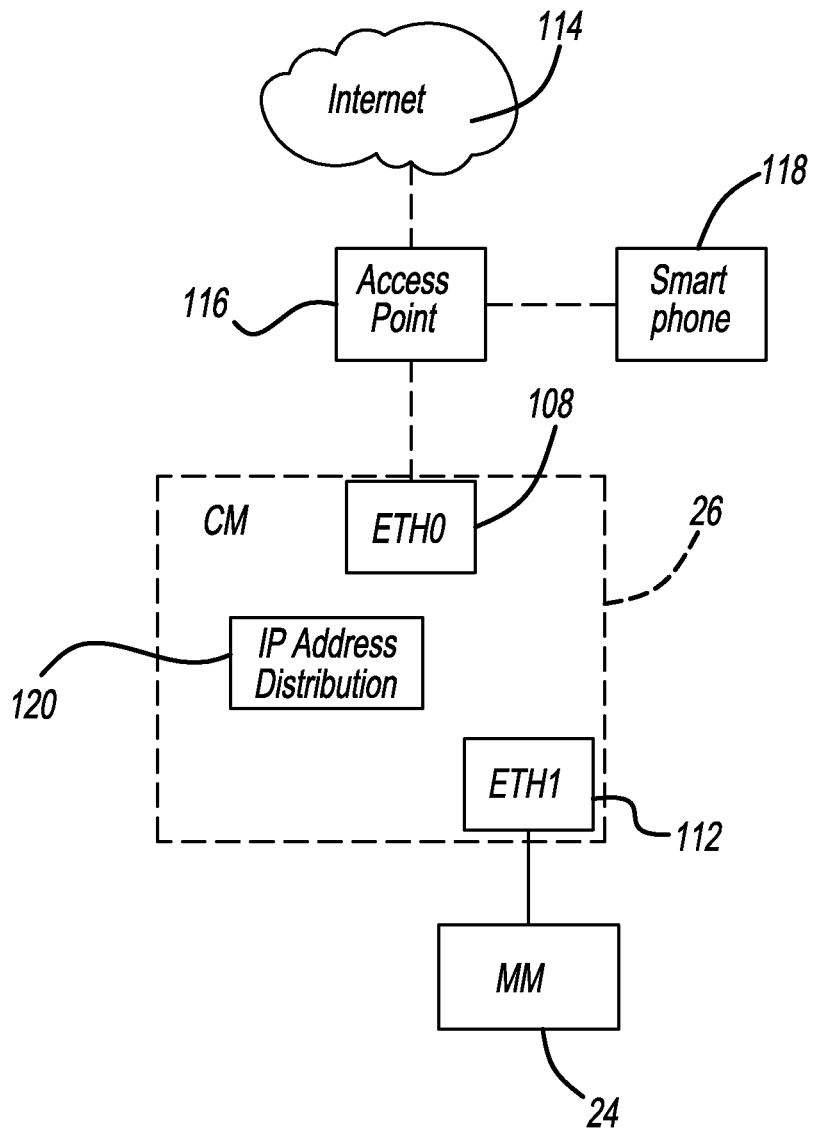
FIG. 15 illustrates an embodiment of a block diagram utilizing an Internet protocol address distribution wherein network access is provided to the main module via the computing module.

Referring to FIG. 15, a block diagram of an embodiment of the system having the main module 24, and computing module 26 is shown, wherein Internet protocol (IP) address distribution is shown. In this configuration, the computing module 26 has Ethernet interfaces 110 and 108. Here, the computing module 26 could be configured to access the external network, such as the Internet 114, independently. This can benefit some application scenarios where another device, such as a smart phone 118, is connected to the same access point 116 and desires to discover the computing modules 26 and the main module 24. This may arise in the case of multiscreen applications that will be later described in this specification.

This feature can be realized by adding a block 120 for IP address distribution. In this case, the computing module 26 is assigned an IP address by the access point 116. Another device, such as a smart phone 118 may be also connected to the access point 116. The IP address distribution block 120 will produce virtual IP addresses for the main module 24 so that the main module 24 would appear as if it is in the same network as both the computing module 26 and the smart phone 118, instead of just being a subnetwork of the computing module 26. The IP address distribution block 120 can be a hardware accelerator or software solution running on any one of the processors of the computing module 26.

Figure 16:
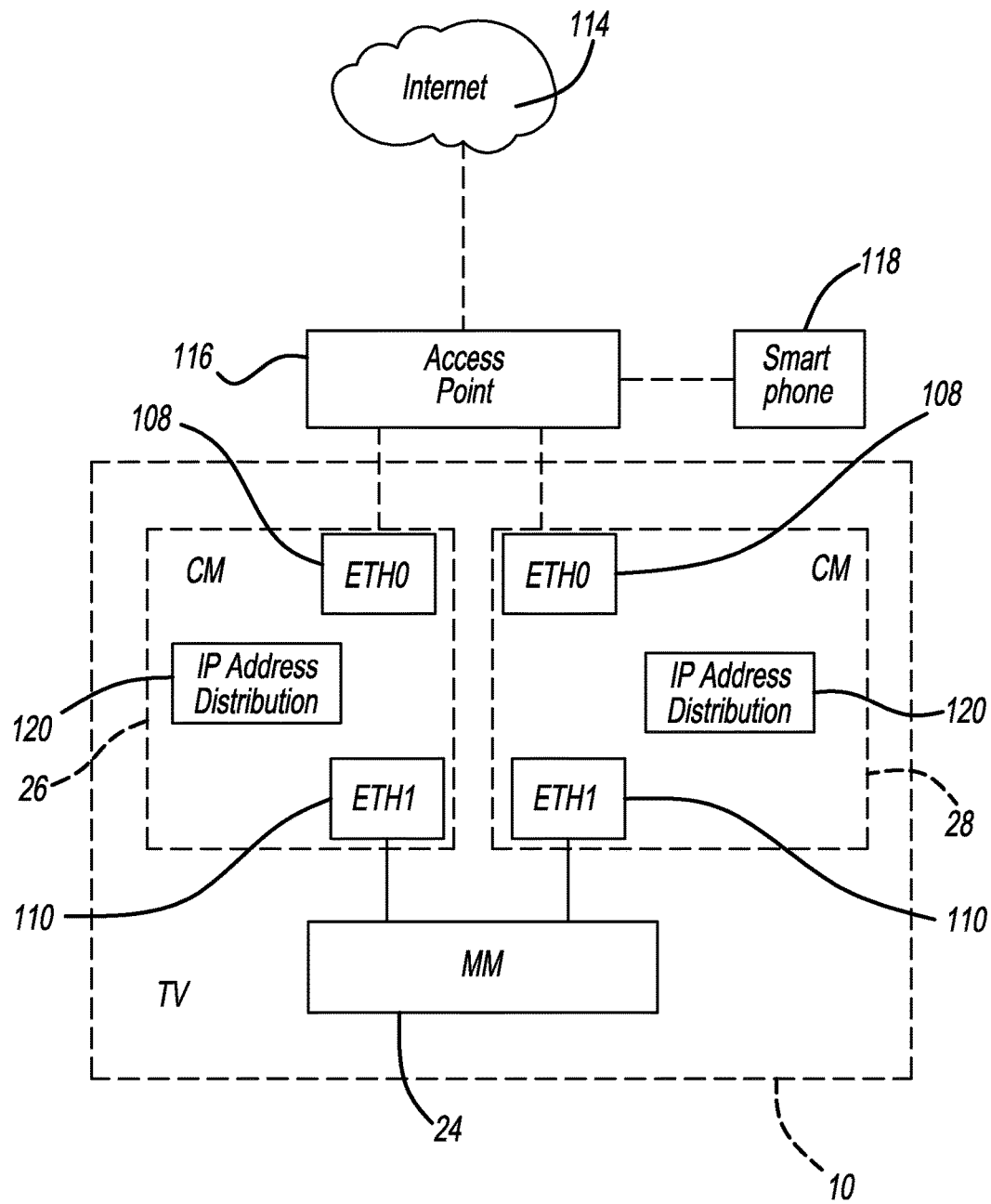
FIG. 16 illustrates an embodiment of a block diagram utilizing an Internet protocol address distribution wherein network access is provided to the main module via one or more computing modules.

Referring to FIG. 16, a block diagram of the system having the main module 24 and both computing modules 26 and 28 is shown, wherein Internet protocol (IP) address distribution is utilized. In this configuration, each of the computing modules 26 and 28 have interfaces 110 and 108. Like before, the computing module 26 and/or 28 could be configured to access the external network, such as the Internet 114, independently. This can benefit some application scenarios where another device, such as a smart phone 118, is connected to the same access point 116 and desires to discover the computing modules 26 or 28 and the main module 24. This may arise in the case of multiscreen applications that will be later described in this specification.

This feature can be realized by adding a block 120 for IP address distribution to each of the computing module 26 and 28. In this case, the computing modules 26 and 28 are assigned an IP address by the access point 116. Another device, such as a smart phone 118 may be also connected to the access point 116. The IP address distribution block 120 in either the computing module 26 or 28 will produce a virtual IP address for the main module 24 so that the main module 24 would appear as if it is in the same network as both the computing modules 26 and/or 28 and the smart phone 118, instead of just being a subnetwork of the computing modules 26 and/or 28. The IP address distribution block 120 can be a hardware accelerator or software solution running on any one of the processors of the computing modules 26 and/or 28.

Figure 17:
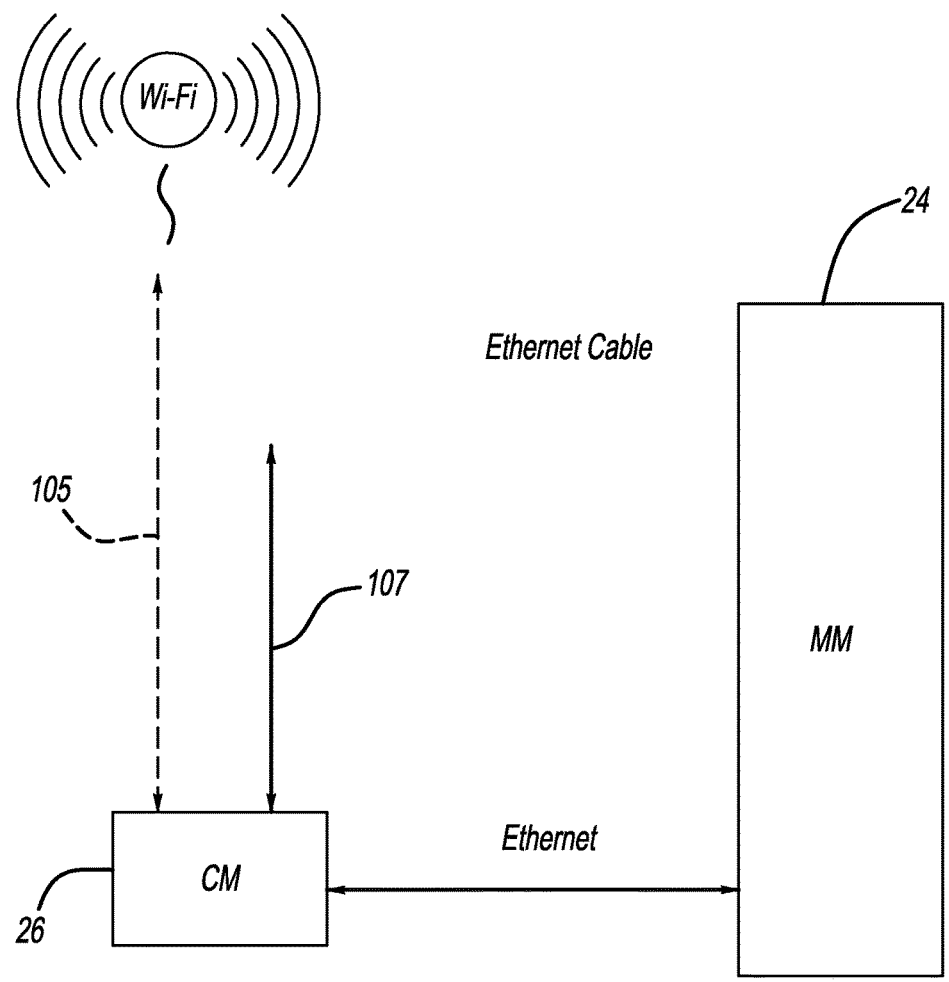
FIG. 17 illustrates an embodiment of another methodology for sharing devices with the computing module via the main module.

Referring to FIG. 17, another methodology for sharing devices with the computing module 26 (or 28) via the main module 24 is shown. In this embodiment, the computing module 26 provides Internet access to main module 24 via either an Ethernet cable 107 or a wireless Internet interface 105. Peripheral devices 122 may also be able to communicate with the computing module 26 (or 28) via the main module 24. As such, the main module 24 may have any one of a number of different ports, such as universal serial bus ports. Peripheral devices, such as cameras, flash drives, keyboards/mouse are physically plugged into the main module 24. These devices are also made visible and useable to the computing modules 26 and 28 through the over-the-network technology.

Like before, one way for device sharing can be implemented by first defining a private protocol. In this case, the main module 24 interprets data from the devices 122 and packages the data with a header containing the main module interpreted information, such as device type, data type, and length. The package data is sent to one or all of the computing modules 26 and/or 28 over the Ethernet. The computing modules 26 and 28 are configured to understand the packaged data format. One possible way of implementing this is to add a virtual device driver to the kennel of the computing modules 26 and 28. The advantage of this private protocol is that performance is good since device data is only interpreted once at the main module 24.

Like described above, another methodology for device sharing utilizes a standard protocol. In this situation, a USB device is interpreted by the main module 24 and is packaged as USB data and sent to one of the computing modules 26 or 28 over the Ethernet connection between the main module 24 and the computing modules 26 or 28 in the form of Internet protocol packets. In virtual software, a USB driver is running on the computing modules 26 or 28. The computing module 26 or 28 would assemble the Internet protocol packets and would see the data as USB data and would see the USB device as if it's plugged into the computing module 26 or 28 itself. This methodology has the advantage in that the computing module 26 or 28 would see the USB devices as if they are plugged into the computing module itself although they are actually plugged into the main module 24.

Figure 18:
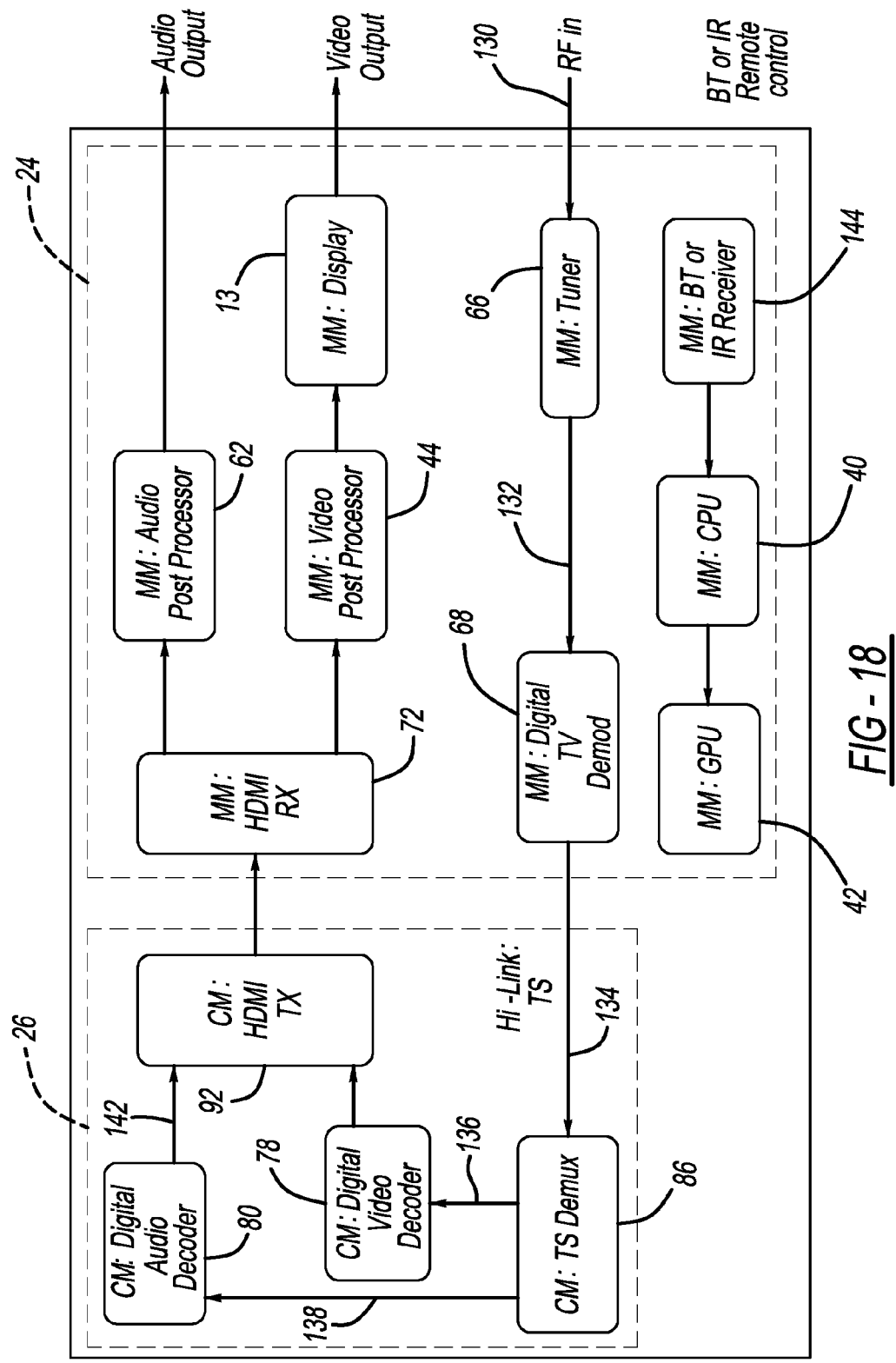
FIG. 18 illustrates an embodiment of a process flow for a digital television signal processing application scenario.

FIG. 18 illustrates an embodiment of a process flow for a digital television signal processing application scenario. As such, previously described elements from FIGS. 4 and 5 are referenced in this scenario and several of the scenarios in the Figures that follow. In this scenario, a television broadcasting signal 130 is received by the tuner 66 of the main module. The tuner 66 of the main module processes the signal and converts it to an intermediate frequency signal 132. The intermediate frequency signal 132 is then provided to the digital television demodulator 68 where the signal is demodulated and a digital signal is obtained. In North America, the ATSC signal is demodulated, in Europe DVB-T signal is demodulated, in China DTMB signal is demodulated, in Japan as well as some other countries, an ISDB-T signal is demodulated or a DVB-C signal is demodulated if the broadcasting signal is a cable television signal.

The output 134 of the demodulation is the transport stream and is sent to the computing module through the connection between the main module 24 and the computing module 26. If there are multiple computing modules on the system, the main module 24 can select the computing module which was selected when digital television was watched last time or any of the computing modules.

The transport stream demultiplexing block 86 in the computing module processes the transport stream and separates it into the elementary audio and video bit streams. The video stream 136 is sent to the digital video decoder 78 of the computing module for video decoding. The audio stream 138 is sent to the digital audio decoder 80 of the computing module for audio decoding. The decoded video and audio signals 140 and 142 are sent back to the main module through a high definition multimedia interface 72. The video post processor 44 receives the video signal and performs image enhancement processing and passes the result to the display block for video output to the display panel. This output can be digital such as V-by-one and LVDS or can be analog such as YPbPr. The audio post processor 62 receives the audio signal and does post processing and prepares an audio output. The audio output can be digital such as I2S or SPDIF or can be analog, such as a line out signal. Interactions between the user and the system is through a Bluetooth or infrared remote control that interacts with appropriate receiver 144. The main module CPU 40 will pass the command received by the receiver 144 and take corresponding action such as bringing up an on screen display or changing the channel.

Figure 19:
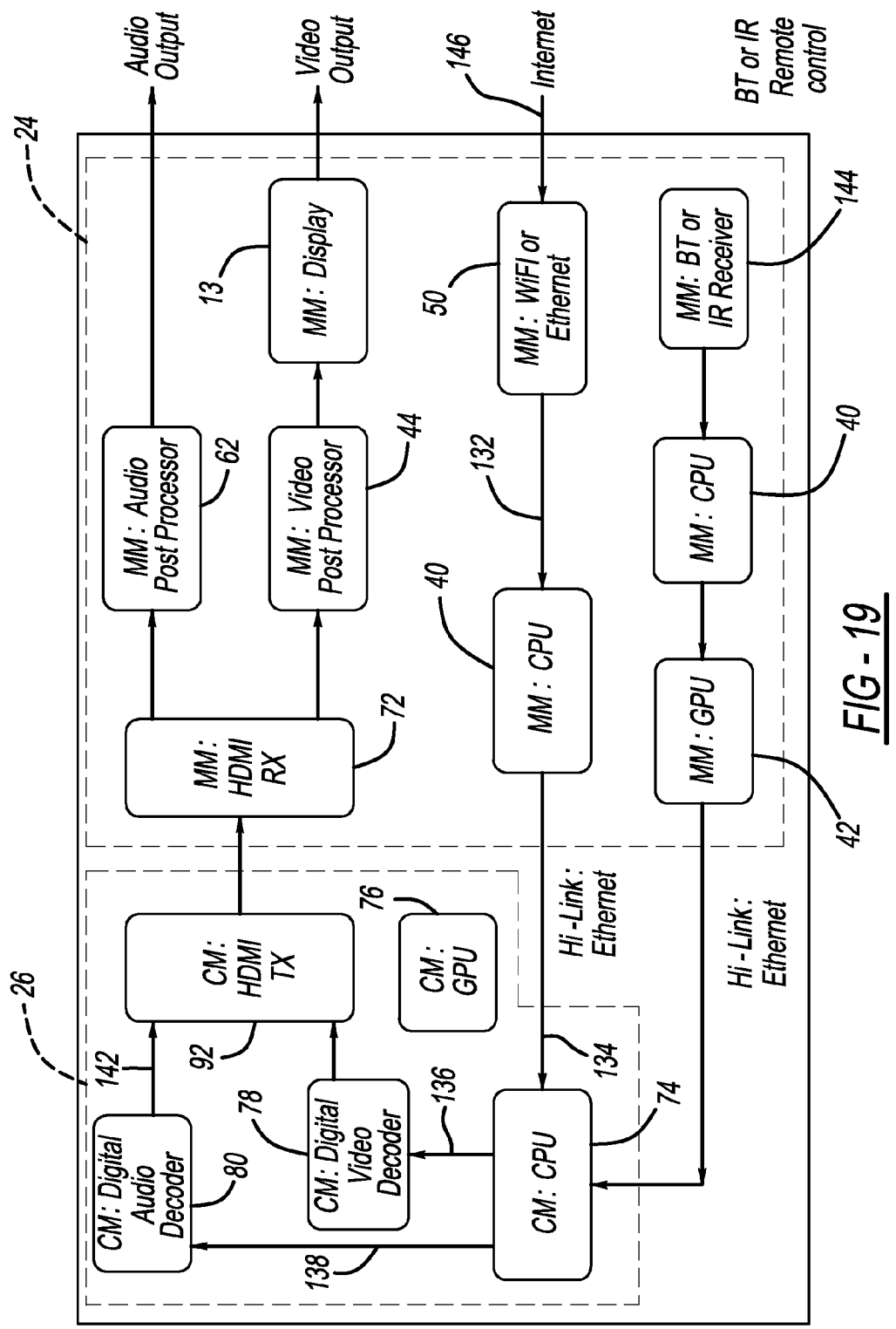
FIG. 19 illustrates an embodiment of a process flow for a scenario involving video on demand streaming.

FIG. 19 illustrates an embodiment of another scenario involving video on demand streaming. Here, Internet data 146 is requested by a computing module streaming application running on the CPU 74 of the computing module. Requested data is received by the Ethernet device 50 or by Wi-Fi on the main module. The data is routed to the computing module that has requested the data. This routing occurs with the help of the main module processor 40. In addition, some hardware accelerator can be included in the main module to assist the data routing if performance is a concern. The data path is the Ethernet link between the main module and the computing module.

The processor 74 of the computing module processes the Internet data and derives the video and audio streams. The video stream 136 is sent to the digital video decoder 78 for video decoding, while the audio stream 138 is sent to the digital audio processor 80 for audio decoding.

The decoded video and audio signals 140 and 142 are sent back to the main module through a high definition multimedia interface 72. The video post processing 44 receives the video signal and may perform image enhancement processing and passes the result to the display processor 13 for video output. Like before, the output can be digital such as V-by-one and LVDS or can be analog such as YPbPr. The audio post processor 62 receives the audio signal and performs post processing and prepares the audio output. This audio output can be digital or can be analog.

Similarly, interactions between the user and the system is through the receiver 144 via a remote control that may be infrared remote or Bluetooth remote. The main module processor 40 will send the command received by the receiver 144 to the computing module through the Ethernet link between the main module and the computing module. In some cases, voice data may be present in some interactions scenarios. The computing module processor 74 will take the corresponding actions based on the input received.

Figure 20:
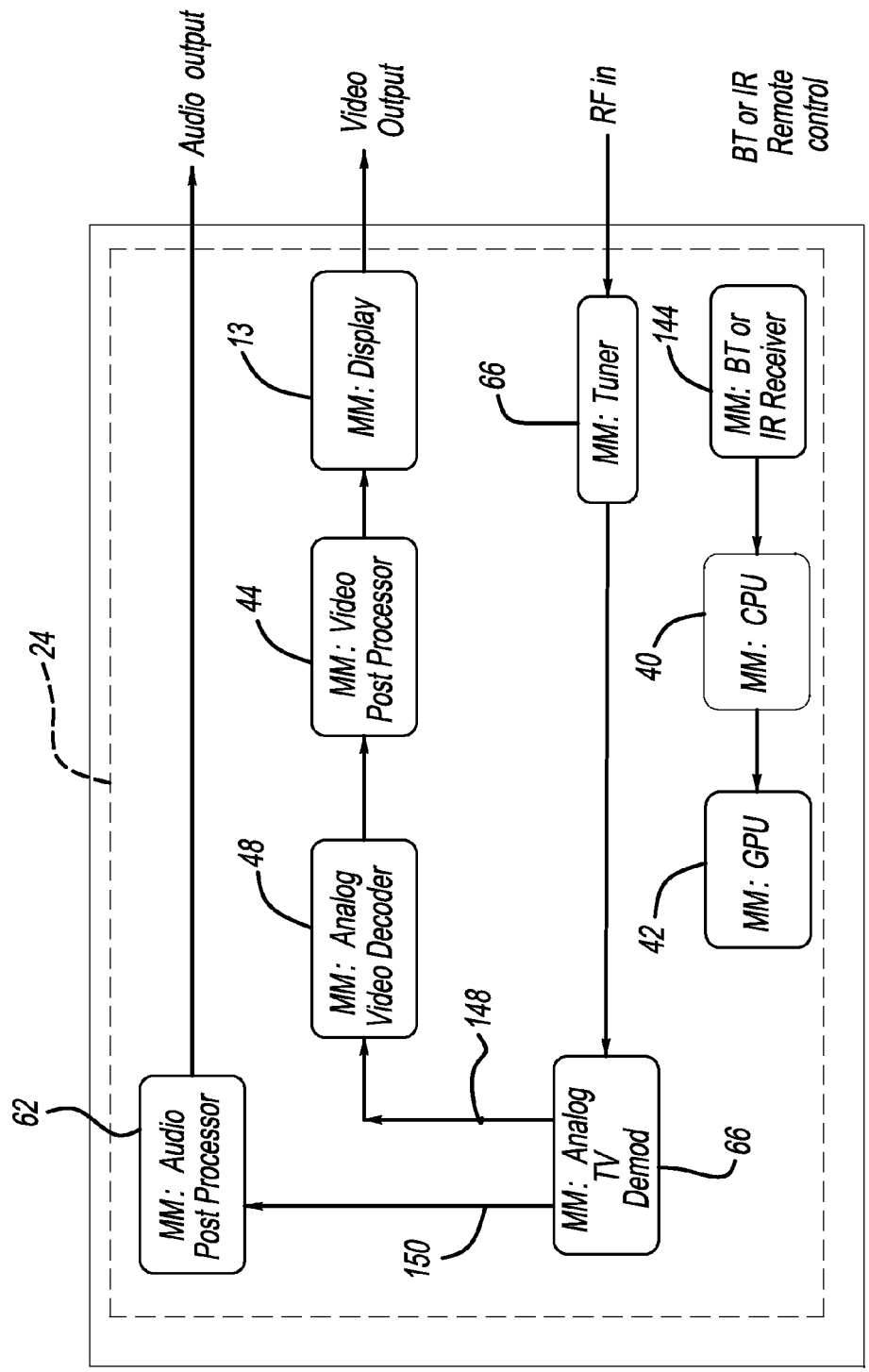
FIG. 20 illustrates an embodiment of a process flow for analog television signal processing.

Referring to FIG. 20, an embodiment of a scenario involving analog television signal processing is shown. In this scenario, a TV broadcasting signal is received by the tuner 66 of the main module 24. The tuner 66 processes the radio frequency signal and changes it to an analog intermediate frequency signal. The intermediate frequency signal is then fed into the analog demodulation block 66, wherein the signal is demodulated and a separate video signal 148 and audio signal 150 are obtained. The video signal 148 is sent to the analog video decoder 48. This video signal may be NSTC compliant in North America, PAL (or certain flavor of PAL) compliant in most European countries and China and SECAM compliant in some other European countries. The analog video decoder 48 derives the component video signals Y, Cb, and Cr. The Y, Cb, and Cr signals are sent to the video post processing block 44, wherein image enhancement processing is performed and the result is passed to the display processor 13 for output to the display panel. The output can be digital such as V-by-one and LVDS or can be analog such as YPbPr. The audio signal 150 is sent to the audio post processor 62, where it is processed for sound effect and output. The output can be digital such as I2S or SPDIF or it can be analog such as a line out signal.

Figure 21:
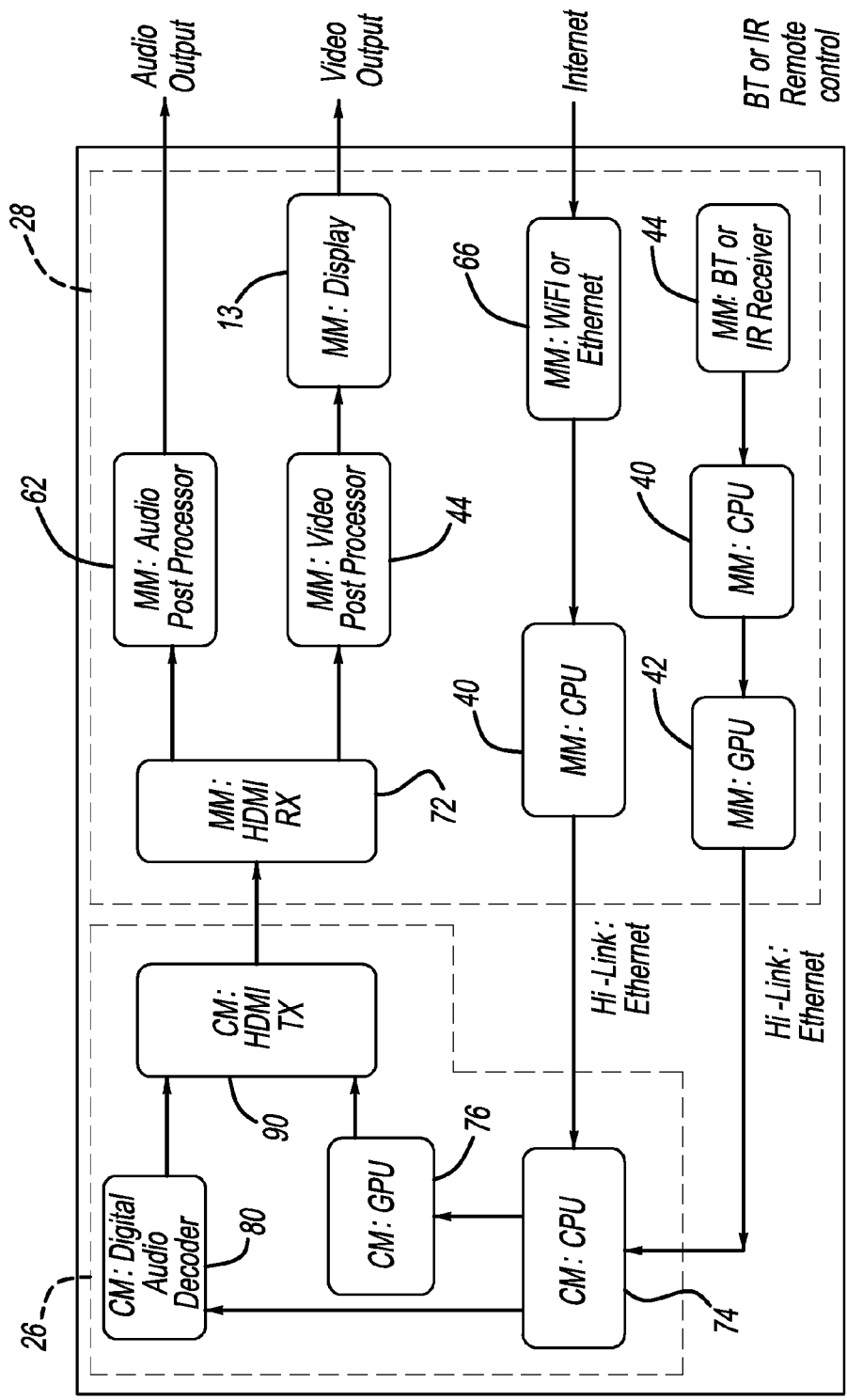
FIG. 21 illustrates an embodiment of a process flow for an interactive gaming scenario.

Referring to FIG. 21, an embodiment of an interactive gaming scenario is shown. Here, the gaming application may be running on the computing module processor 74 and the graphic processor 76 of the computing module. Some or all of the graphic data may be rendered and some Internet data may be requested by the gaming application. The requested data is received by the Ethernet device 66 or by a wireless network on the main module 24. This received data is routed to the computing module that has requested the data. This routing occurs with the help of the main module processor 40. Some hardware acceleration may be included in the main module to assist the data routing if performance is a concern. The path the data may take is usually the path of the Ethernet link between the main module and the computing module.

The processor 74 the computing module processes the Internet data and would usually engage the graphics processor 76 to mix Internet data with graphic data generated by a gaming application. The audio signal from the gaming application can be sent to the digital audio decoder 80 for sound effect processes sing. The graphic picture and audio signals are sent back to the main module through the high definition multimedia interfaces 92 and 72. The video post processing block 44 receives the video signal and may perform image enhancement processing and passes the result to the display processor 13 for video output. Like before, the video output can be done via V-by-one and LVDS or can be analog such as YPbPr.

The audio post processor 62 receives the audio signal and may perform post processing and prepares audio output. The audio output can be digital such as I2S or SPDIF or can be analog such as a line out signal.

Interactions between the user and the system is through either a Bluetooth or infrared remote control or a Bluetooth game controller in a modern system, whose signal is received by the Bluetooth or infrared receiver 144 on the main module. The processor 40 of the main module will send a command to the computing module through the Ethernet link between the main module and the computing module. Also, it should be understood that voice data may be present in some interactive scenarios. The computing module processor 74 will take corresponding actions to control the game based on the voice data received.

Referring to FIGS. 22 and 23, these Figures illustrate an embodiment of an application scenario from a set top box. FIG. 22 illustrates wherein the set top box outputs a HDMI signal. The HDMI receiver 72 of the main module receives the HDMI signal. The HDMI receiver 72 derives the video signal and sends it to the video post processing block 44, wherein image enhancement processing is performed and the end result is passed to display processor 13 for output to the display panel. As always, the output can take one of many of the number of different formats, such as V-by-one and LVDS or can be analog such as YPbPr. The HDMI receiver 72 also sends the audio signal to the audio post processor 62, wherein the audio signal is processed for sound effect and output. The output can be digital such as I2S or SPDIF or can be analog such as a line out signal.

Referring to FIG. 23, this scenario shows with external set top box outputs analog video and audio signals. Here, the audio video input device 70 digitizes the video signal and sends it to the video post processor 44, wherein image enhancement processing is performed and the end result is passed to display block 13 for output to a display panel. The output can be digital such as V-by-one and LVDS or can be analog such as YPbPr. The audio/video input device 70 also digitizes the audio signal and sends it to the audio post processor 62, wherein the signal was processed for sound effect and output. The output can be digital, such as I2S or SPDIF or can be analog such as a line out signal.

Figure 24:
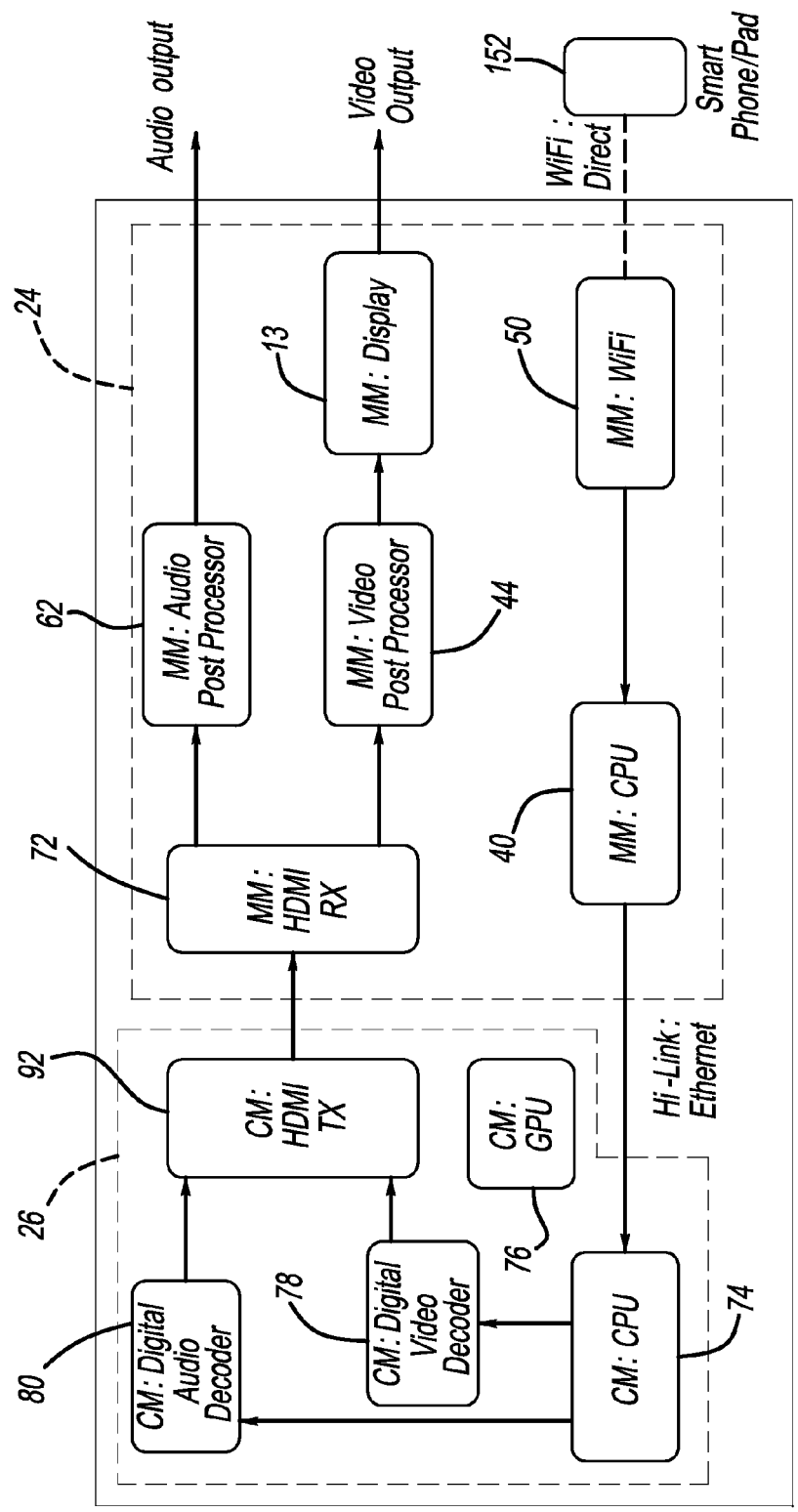
FIG. 24 illustrates an embodiment of a process flow for a multiscreen sharing application scenario.

Referring to FIG. 24, an embodiment of a multiscreen sharing application scenario is shown. Here, the TV system 10 or the main module 24 can mirror or repeat the images that are shown on a smart phone or tablet 152. The smart phone or tablet 152 sends an encoded or compressed bit stream of the screen images to the main module 24 through Wi-Fi to the receiver 50. The bit stream is routed to one of the computing modules 26 or 28. This routing may occur with the help of the processor 40 of the main module. In addition, some hardware accelerator can be included in them main module to assist the data routing if performance is a concern. The data path may be the Ethernet link between the main module 24 and the computing module 26 or 28.

Figure 25:
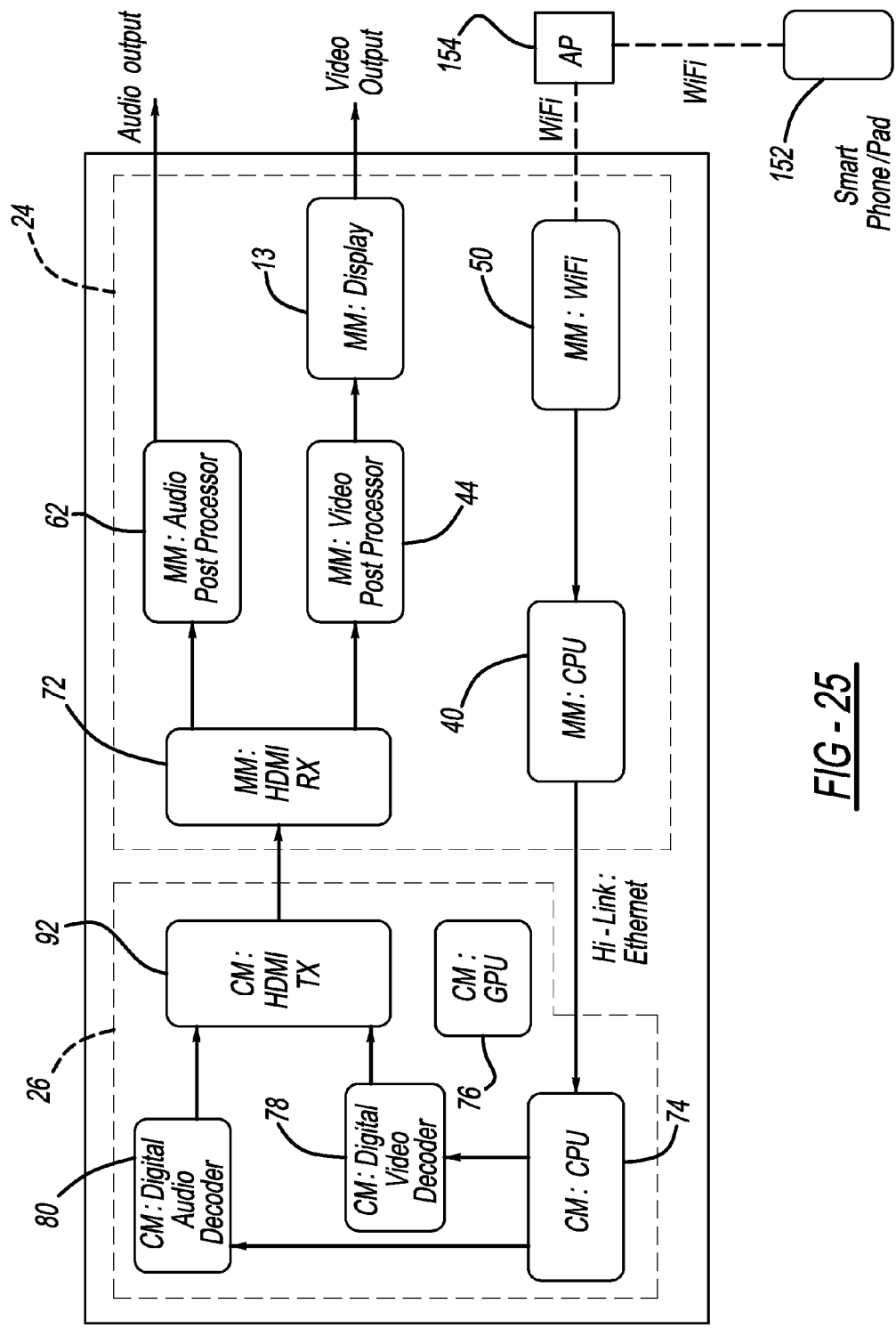
FIG. 25 illustrates an embodiment of a process flow for a multiscreen interaction scenario.

The computing module processor 74 may process the bit stream and derive the video and audio streams. The video stream is sent to the digital video decoder 78 for video decoding and the audio stream is sent to the digital audio processor 80 for audio decoding. The decoded video and audio signals are sent back to the main module through the HDMI transmitter 92. The video post processing block 44 receives the video signal and does image enhancement processing and passes the results to display processor 13 for video output. The audio post processor 62 receives the audio signals and may perform post processing and prepare for audio output. Referring to FIG. 25, an embodiment of a multiscreen interaction scenario is shown. Here, the smart phone or tablet device 152 may work together with the TV system 10 to bring some desired content to the main module display. The smart phone or tablet device 152 and the main module both connect an external wireless access point 154 that allows connection to the Internet. The smart phone or tablet 152 sends the URL of the intended content to the main module 24.

The main module 24 requests the desired bit stream from the URL and routes the bit stream to the intended application in the intended computing module 26 or 28. Alternatively, when the intended computing module 26 or 28 is made with a virtual IP address as described previously, the smart phone or tablet 152 can send the URL of the intended content to the computing module 26 or 28 through the main module 24. Thus, the computing module 26 or 28 requests the desired video bit stream from the URL and the bit stream is fetched to the computing module via the main module. Routing is with the help of the processor 40 of the main module. Some hardware accelerator can be included in the main module 24 to assist the data routing if performance is a concern. The data path between the main module 24 and the computing module 26 or 28 may be the Ethernet link between the two.

The processor 74 of the computing module processes the bit stream and derives the video and audio streams. The video stream is sent to the video decoder 78 for video decoding, while the audio stream is sent to the digital audio processor 80 for audio decoding.

The decoded video and audio signals are sent back to the main module 24 through the HMDI interfaces 92 and 72. The video post processor 44 receives the video signal and performs image enhancement and processing and passes the result to the display processor 13 for video output. The audio post processor 62 receives the audio signal and does post processing and prepares an audio output. Video and audio may be displayed by the main module display 12 while the phone or tablet 152 performs other tasks, such as interactions.

Figure 26:
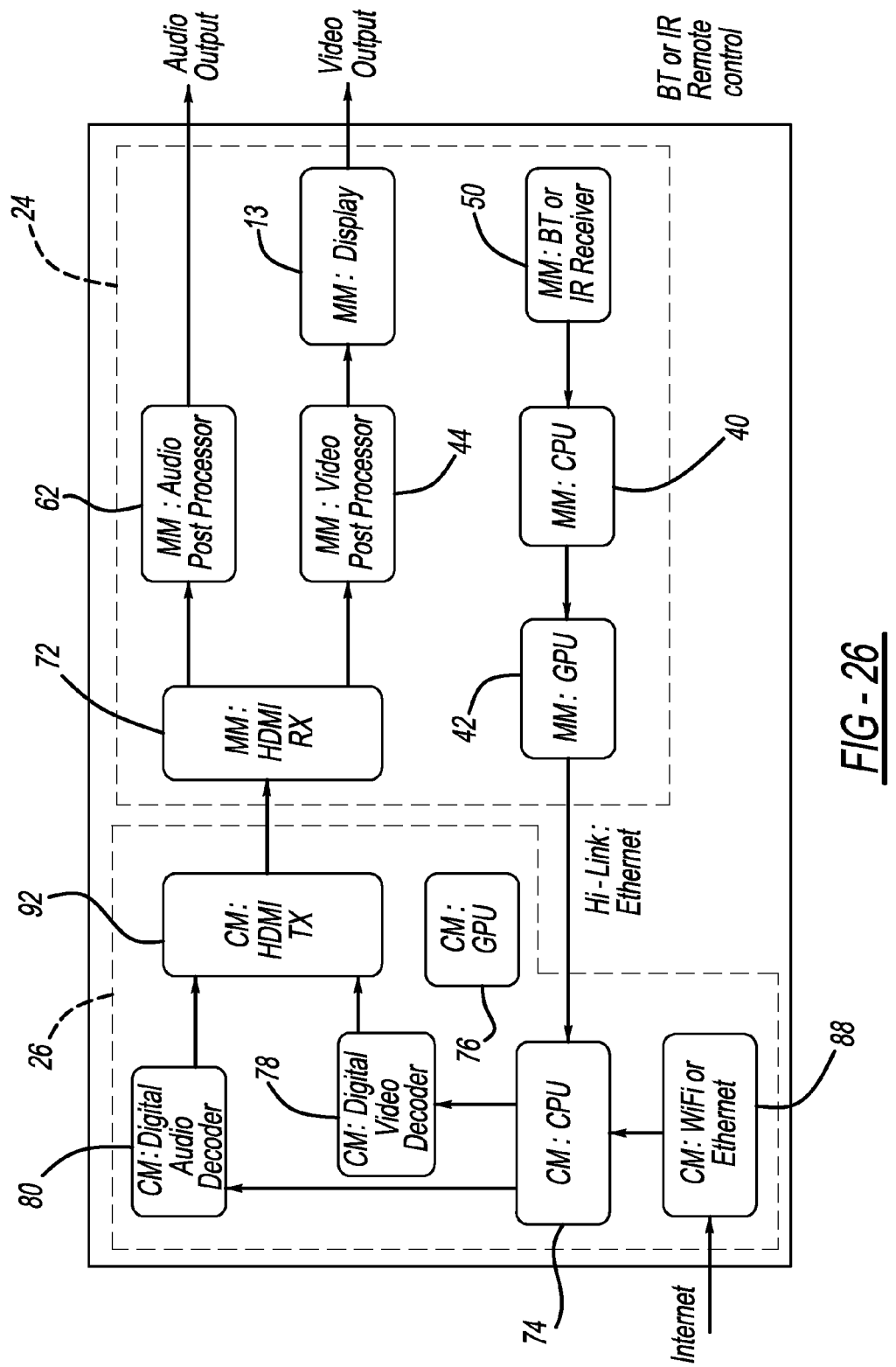
FIG. 26 illustrates an embodiment of a process flow for a video on demand streaming scenario.

Referring to FIG. 26, another scenario involving video on demand streaming is shown. Here, the computing module is configured to have independent network access. Internet data is requested by the computing module streaming application running on the computing module processor 74. The requested data may be received by the network block 88 either by Ethernet or by Wi-Fi. The processor 74 processes the Internet data and derives the video and audio streams. The video stream is transmitted to the digital video decoder 78, while the audio stream is transmitted to the digital audio decoder 80. The decoded video and audio streams are sent back to the main module through the HDMI interfaces 72 and 92. The video post processing block 44 receives the video signal and may perform image enhancement processing and pass the result to the display processor 13 for video output. The audio post processor 62 receives the audio signals and may perform audio post processing and prepare an audio output. Interactions between the user and the system may be through the receiver 144 which may receive a Bluetooth or infrared remote control signal. The main module processor 40 will send the command to the computing module through the Ethernet link between the main module and the computing module. Further, voice data may be present in some interaction scenarios. The computing module processor 74 will take corresponding actions based on any received data.

Figure 27:
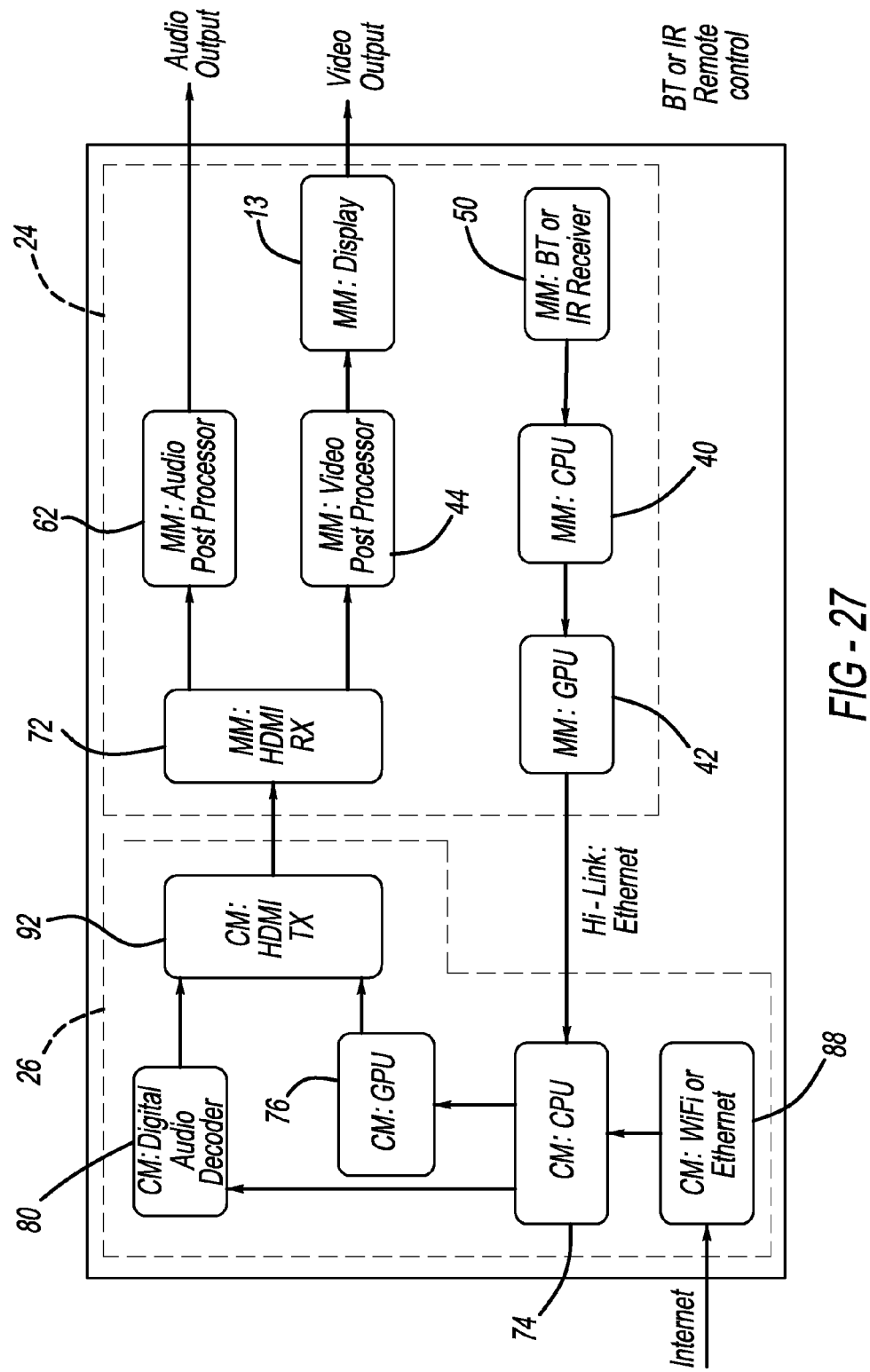
FIG. 27 illustrates an embodiment of a process flow for an interactive gaming scenario.

Referring to FIG. 27, an application scenario involving interactive gaming is shown. Here, the gaming application may be running on the processor 74 and graphics processor 76 of the computing module 26. Some graphic data may be rendered. In addition, it is possible that some Internet data may be requested by the game application. This requested data is received by the network device 88 via either Ethernet or Wi-Fi. The computing module processor 74 processes the Internet data that would usually engage the graphics processor 76 so as to mix the Internet data with the graphic data generated by the game application.

The audio signal from the game application can be sent to the digital audio decoder 80 for sound effect processing. The graphic picture and audio signals are sent back to the main module through the HDMI transmitters and receivers 72 and 92. The video post processor 44 receives the video signal and may perform image enhancement processing and passes the result to the display processor 13 for video output. The audio post processor 62 receives the audio signal and may perform post processing as it prepares an audio output.

Interactions between the user and the system may be through a Bluetooth or infrared remote control interacting with a receiver 144. For example, the game controller may be a Bluetooth controller whose signal is received by the receiver 144 on the main module. The processor 40 of the main module will send the command to the computing module through the Internet link between the main module and the computing module. As before, voice data may be present in some interactive scenarios, wherein the processor 74 of the main module will take corresponding actions based on the received data.

Figure 28:
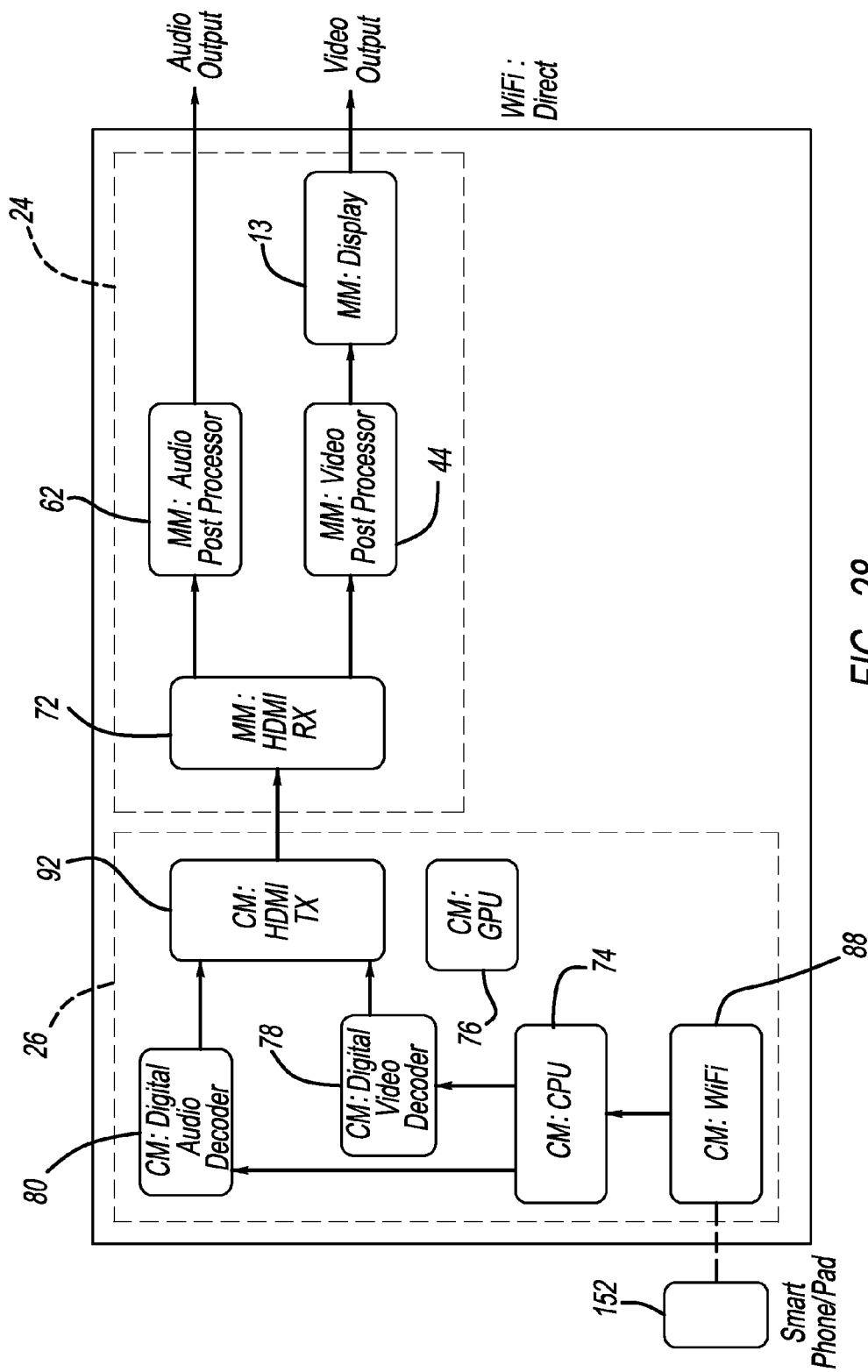
FIG. 28 illustrates an embodiment of a process flow for a multiscreen sharing application scenario.

Referring to FIG. 28, a multiscreen sharing application scenario is shown. Here, the TV system 10 can mirror or repeat the images that are shown on a smart phone or tablet 152. The smart phone or tablet 152 sends an encoded or compressed bit stream of the screen images to the computing module 26 through Wi-Fi to the receiver 88.

The computing module processor 74 may process the bit stream and derive the video and audio streams. The video stream is sent to the digital video decoder 78 for video decoding and the audio stream is sent to the digital audio processor 80 for audio decoding. The decoded video and audio signals are sent back to the main module through the HDMI transmitter 92. The video post processing block 44 receives the video signal and does image enhancement processing and passes the results to display processor 13 for video output. The audio post processor 62 receives the audio signals and may perform post processing and prepare for audio output. Referring to FIG. 29, a multiscreen interaction scenario is shown. Here, the smart phone or tablet device 152 may work together with the TV system 10 to bring some desired content to the main module display. The smart phone or tablet device 152 and the computing module 26 both connect an external wireless access point 154 that allows connection to the Internet. The smart phone or tablet 152 sends the URL of the intended content to the computing module 26

The computing module 26 requests the desired bit stream from the URL and routes the bit stream to the processor 74. The processor 74 of the computing module processes the bit stream and derives the video and audio streams. The video stream is sent to the video decoder 78 for video decoding, while the audio stream is sent to the digital audio processor 80 for audio decoding.

The decoded video and audio signals are sent back to the main module 24 through the HMDI interfaces 92 and 72. The video post processor 44 receives the video signal and performs image enhancement and processing and passes the result to the display processor 13 for video output. The audio post processor 62 receives the audio signal and does post processing and prepares an audio output. Video and audio may be displayed by the main module display 12 while the phone or tablet 152 performs other tasks, such as interactions.

Referring back to FIG. 4, the powering on and off of the system 10 will be briefly explained. Generally, when the system 10 is powered on, the main module 24 is first to begin booting up. The main module 24 may provide some type of on screen display to display 12 as it begins to initialize the main module 24 blocks. The main module 24 will provide power to the computing modules 26 and 28 so that the computing modules can also being booting up.

Upon both the main module 24 and the computing modules 26 and 28 finish booting, the system 10 will go to a television channel or streaming service application where the user last left when the system 10 was powered off. For a first time boot, the system 10 may default to a certain television channel or a certain user interface.

When there are two or more computing modules 26 and 28, one of the computing modules, which may be the computing module whose application is presented to the user interface upon booting up, or all the computing modules can be in the power on state. It is also possible that some computing modules, such as those without a user interface presence, can be chosen to be in standby or sleep or even power off state to save power.

When powering off the system, the computing modules 26 and 28 may be powered off first, with each computing module 26 or 28 storing in its own state. The main module 24 may then be ready to be powered off and would also store its own state, including information of which computing module 26 or 28 was active. In the process of powering off, the display 12 may be shut off while the powering off process is continuing in the background.

Referring to FIG. 30, once the system 10 is powered on and a computing module 26 is detected as being plugged in, the main module 24 can probe for device information of the computing module 26 by querying a solid state device 158 of the computing module 26. The solid state device 158 may be an EEPROM device that stores ID information in the form of EDID. By so doing, the system 10 can verify if the computing module 26 is certified and learn the compatibility and capability of the computing module 26. This provides some protection to the system 10. The links 160 and 162 between the computing module 26 and main module 24 may be I2C links.

Referring to FIG. 31, a modular television system 210 is shown. As its primary components, the modular television system includes a display subsystem 212 having a housing 214 that contains a display panel 216 for displaying images. In addition, the system 210 includes a television module subsystem 218. The television module subsystem 218 includes a housing 220. The housing 220 may include a main board 222 and ports 224, 227 and 226. It should be understood that the ports 224, 227 and 226 may be combined into a signal port or may be broken up into multiple ports. The display subsystem 212 may also contain ports 228, 229 and 230 that may be connected to ports 224, 227 and 226, respectively, by cords 232, 231 and 234. As stated before, any number of ports may be utilized. In a case a signal port is used on the television module subsystem 218 and the display subsystem 212, only a single cord will be utilized.

In the embodiment shown in FIG. 31, the housing 220 of the television module subsystem includes a timing controller 236, a power source 238 and a backlight controller 240. The timing controller 236 is in communication with the display panel 216 as configured to control images displayed by the display panel 216 of the display subsystem 212.

The backlight controller 240 is in communication with the display panel 216 as well. The backlight controller 240 is configured to control the backlighting on the display panel 216. Another cord 231 may be connected to a port 227 of the television module subsystem 218 and a port 229 of the display subsystem 212. This allows for the backlight controller to control the backlights of the display panel 216.

The power supply 238 may be configured to provide power to the main board 222 of the television module subsystem 218 and provide power to the display subsystem 212 as well via cord or cords 232 and 234.

Speakers may be located in the housing 220 of the television subsystem module 218. The speakers 242 function to provide audio related to the images displayed on the display panel 216.

Figure 32:
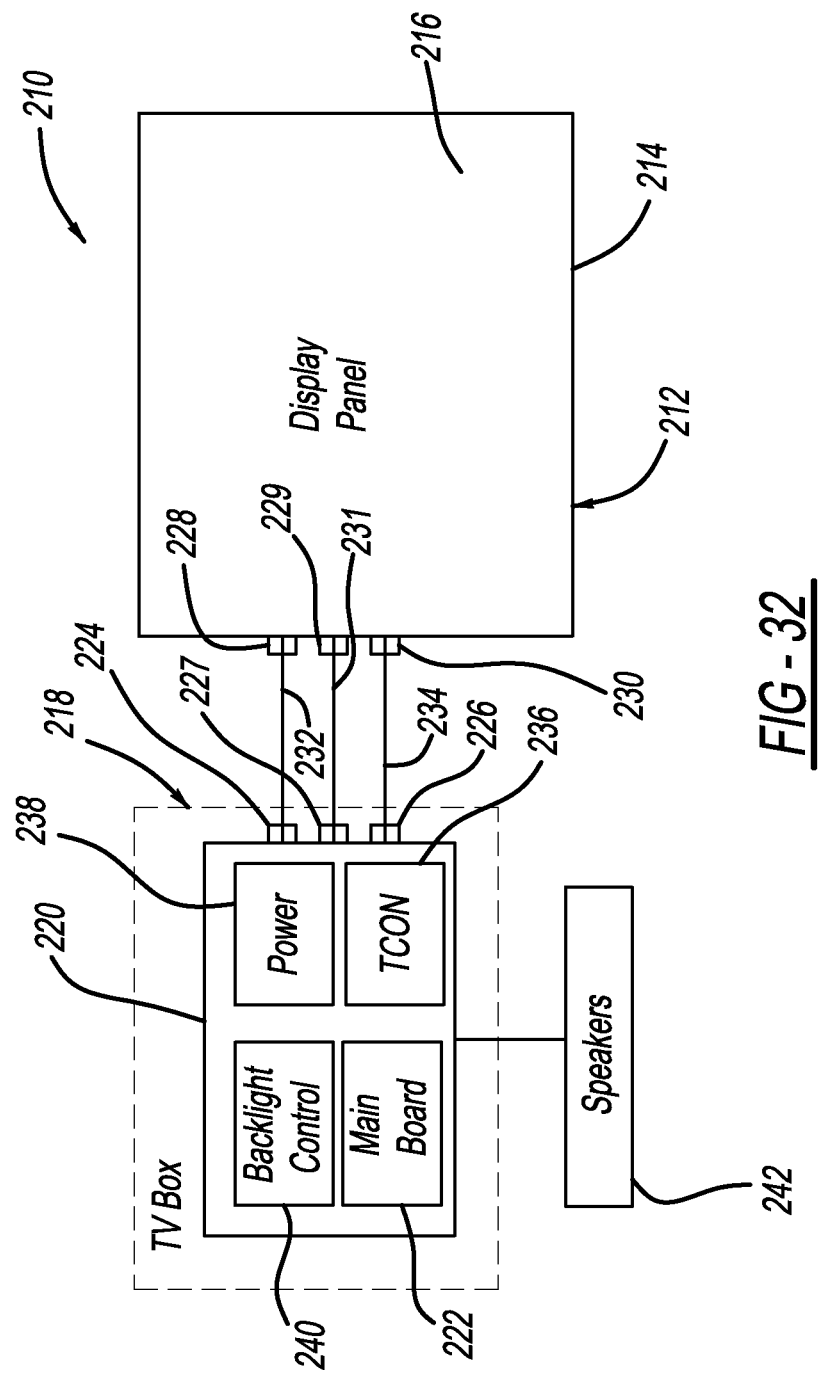
FIG. 32 illustrates an embodiment of a modular television system having speakers separate from the housing of the television subsystem.
Figure 33:
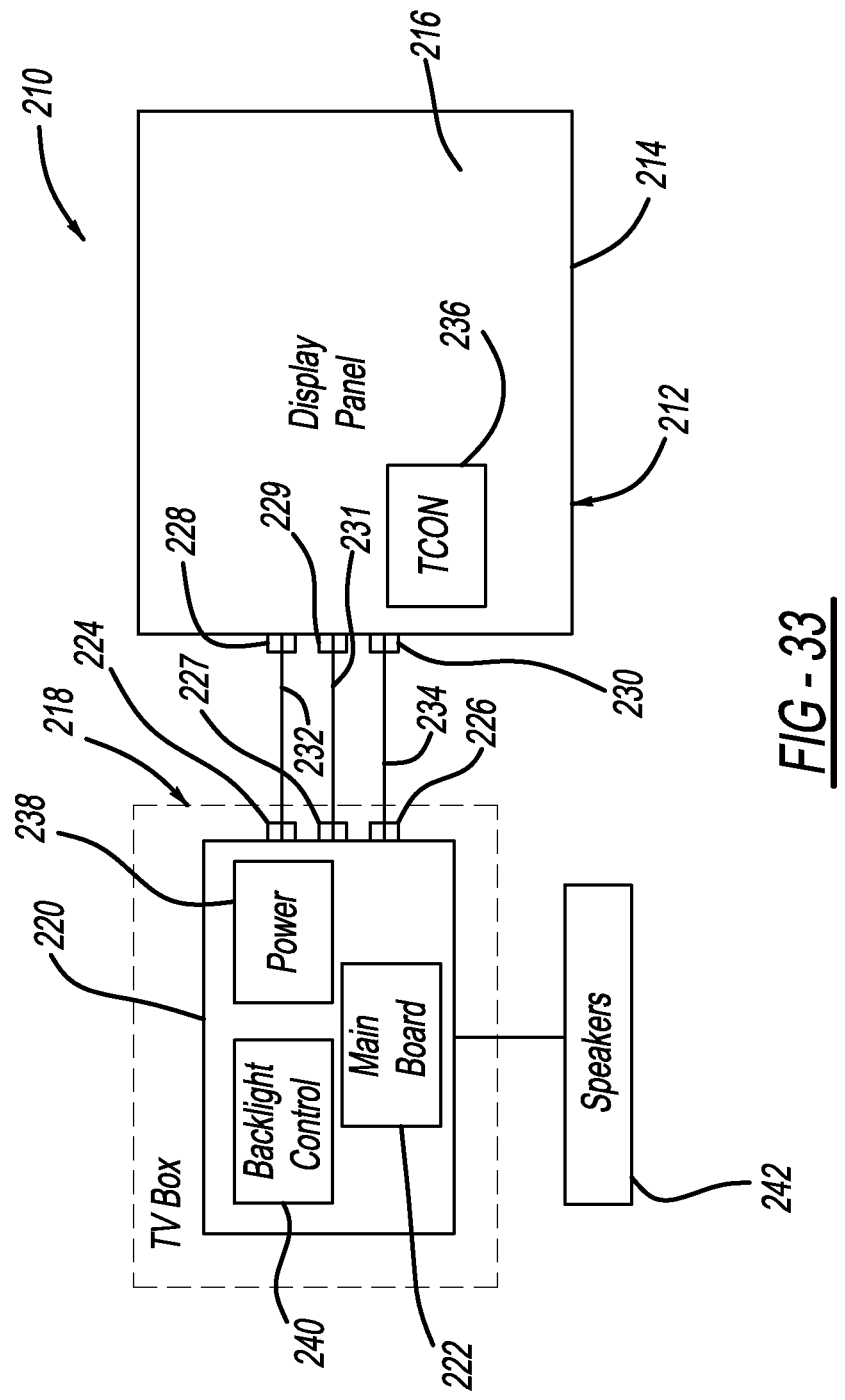
FIG. 33 illustrates an embodiment of a modular television system having a timing controller located within the housing of the display system.
Figure 34:
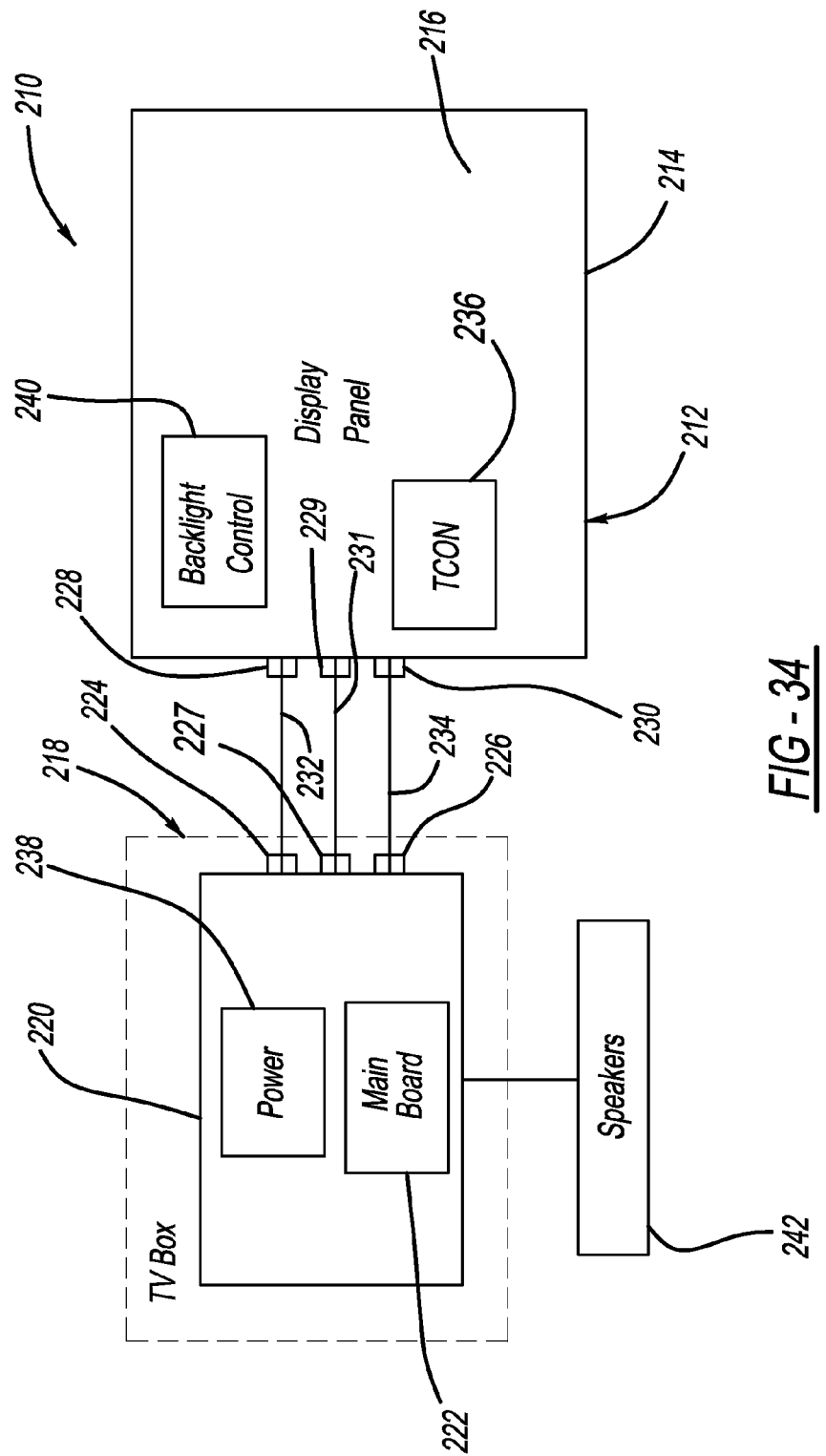
FIG. 34 illustrates an embodiment of a modular television system having a backlight control located within the housing of the display system.

FIG. 32 illustrates another embodiment of the system 210. In this embodiment, the speakers 242 are separate from the housing 220 of the subsystem 218. FIG. 33 illustrates yet another embodiment of the system 210, wherein the timing controller 236 is not located within the housing 220 of the television subsystem 218, but is rather located within the housing 214 of the display system 212. In addition or alternatively to, it is also possible the backlight controller 240 can also be located within the housing 214 of the display subsystem 212 as well, as shown in FIG. 34.

Figure 35:
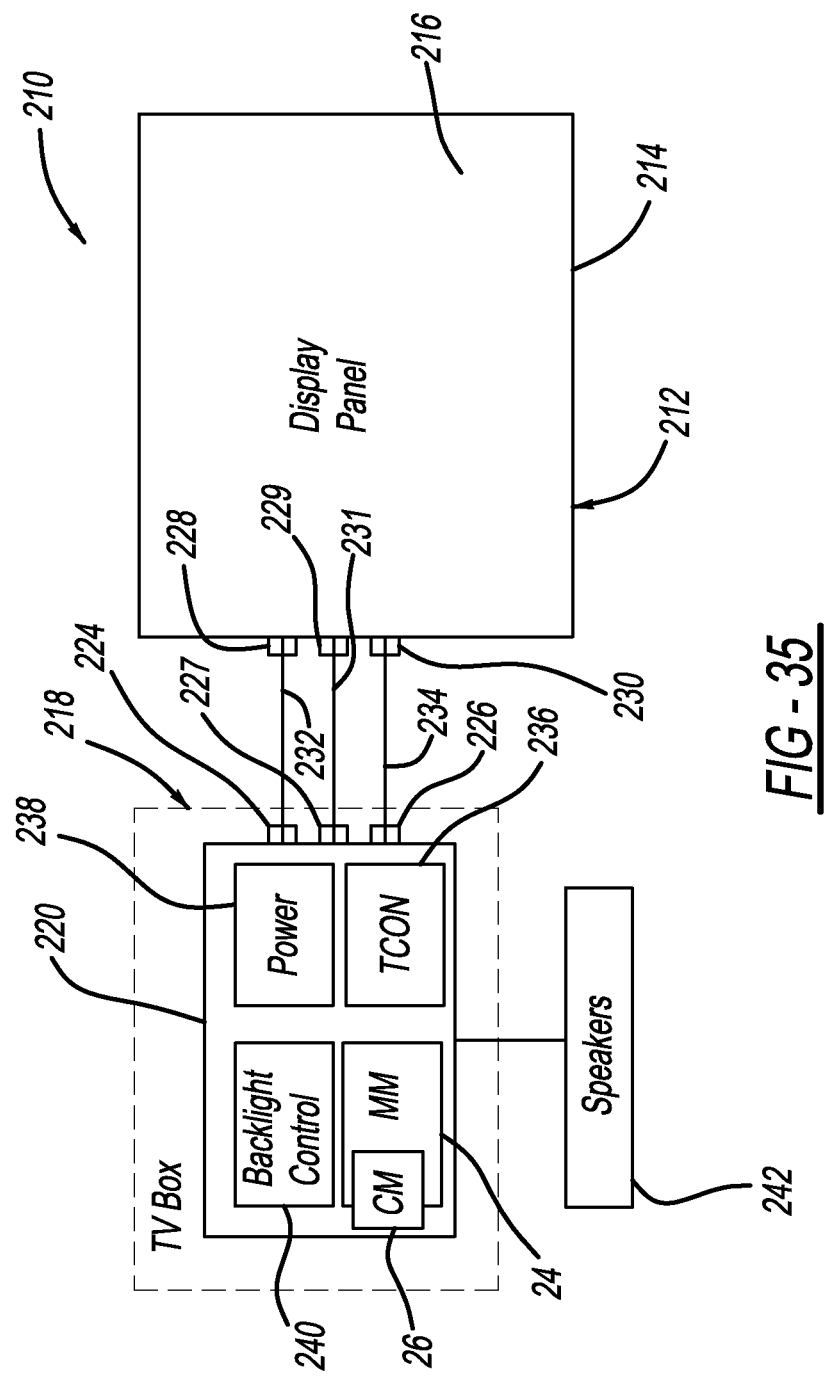
FIG. 35 illustrates an embodiment of a modular television system having a main module and a computing module.

FIG. 35 illustrates another embodiment of the system 210. Here, the main board 222 has been replaced with a main module 24 and an optional computing module 26 previously described in FIG. 5 as well as other Figures and paragraphs of this description. In like manner, the backlight control 240 and timing controller 236 may be located within the housing 220 of the television subsystem module or may be located within the housing 214 of the display panel subsystem 212. It should be understood, that the main module 24 may now be separate from the display, unlike the embodiments previously described.

FIG. 36 illustrates yet another embodiment of the system 210. Here, the television module subsystem 218 and the display subsystem 212 have separate speakers 242a and 242b. Generally, the speakers 242a and 242b may be connected to the television subsystem 218, which will provide the speakers 242a and 242b with an appropriate audio signal. Of course, it should be understood that any one of the number of different speakers or number of speakers may be utilized.

Referring to FIGS. 37, 38, and 39, alternative embodiments of the system 210 are shown. In each of these embodiments, the housing 220 of the television module subsystem 218 is attached to a backside of the display panel system 212, such that the housing 220 is located on the opposite side of the display panel subsystem 212 in relation to the actual display 216. In FIG. 37, only one speaker system 242 is shown generally at the bottom of the housing 214 of the display system 212. FIG. 38 shows speakers 242a and 242b generally located at opposing sides of the housing 214 of the display module subsystem 212. Finally, FIG. 39 shows speakers 242a, 242b, 242c, and 242d each generally being in contact with the perimeter of the housing 214 of the display module subsystem 212. Of course, it should be understood that any number of different speaker configurations can be utilized and that embodiments shown in these Figures are for illustrative purposes.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

I claim:

1. A modular television system, the modular television system comprising:
   a display subsystem having a display subsystem housing, a display panel and a display subsystem port, wherein the display panel is housed within the display subsystem housing;
   a television module subsystem having a television module housing, a main board and television module port in communication with the main board, the main board being located within the television module housing, wherein the television module port is configured to communicate with the display subsystem port of the display subsystem;
   a timing controller module in communication with the display panel, the timing controller module configured to control images displayed by the display panel of the display subsystem;

a backlight controller in communication with the display panel, the backlight controller configured to control backlighting on the display panel;

a power supply located in the television module housing of the television module subsystem, the power supply configured to supply power to the main board of the television module subsystem and the display subsystem;

wherein the timing controller module is located in either the television module housing or the display subsystem housing;

wherein the backlight controller is located in either the television module housing or the display subsystem housing;

wherein the main board of the television module subsystem has a main module processor;

at least one computing module port in communication with the main module processor and located within the television module housing;

wherein the main module processor is configured to communicate with a removable computing module, the removable computing module is configured to connect to the computing module port of the main module, wherein the removable computing module has a computing module processor configured to assist the main module processor with presenting audio and video received by at least one of a plurality of input/output ports;

wherein the main module processor is configured to direct data received from an external device to the computing module processor for processing and wherein the main module processor is configured to receive processed data from the computing module and display images of the processed data on the display of the modular television system; and wherein the computing module is responsible for ultra-high definition digital video recording, transport stream demultiplexing for digital television decoding, digital multimedia decoding, providing a high quality graphical user interface of the user of the system, or allowing for the downloading and execution of third party applications such as video streaming or gaming.

2. The modular television system of claim 1, wherein both the timing controller module and the backlight controller is located in the television module housing.

3. The modular television system of claim 1, wherein both the timing controller module and the backlight controller is located in the display subsystem housing.

4. The system of claim 1, wherein the main module processor is configured to perform analog video receiving and decoding, digital video receiving, and connecting to a network via a plurality of input/output ports.

5. The system of claim 1, wherein the television module housing further comprises the plurality of input/output ports and wherein the main module processor is configured to allow the removable computing module to communicate with the plurality of input/output ports when the removable computing module is connected to the computing module port.

6. The system of claim 1, wherein the removable computing module comprises the plurality of input/output ports and wherein a computing module processor is configured to allow the main module processor to communicate with the plurality of input/output ports when the removable computing module is connected to the computing module port.

7. The modular television system of claim 1, wherein the computing module port further includes an interface configured to provide to the computing module Ethernet, a transport stream for decoding after a television signal is demodulated by the main module, and a High-Definition Multimedia Interface.

8. A television module subsystem, the subsystem comprising:

a housing;

a main board;

a television module port in communication with the main board;

the main board being located within the housing, wherein the television module port is configured to communicate with a display subsystem port of a display subsystem to control a display panel of the display subsystem, wherein the the display subsystem is separate from the housing of the television module subsystem;

a power supply located in the housing of the television module subsystem, the power supply configured to supply power to the main board of the television module subsystem and the display subsystem when the display subsystem port is in communication with the television module port;

wherein the main board of the television module subsystem has a main module processor;

at least one computing module port in communication with the main module processor and located within the television module housing;

wherein the main module processor is configured to communicate with a removable computing module, the removable computing module is configured to connect to the computing module port of the main module, wherein the removable computing module has a computing module processor configured to assist the main module processor with presenting audio and video received by at least one of a plurality of input/output ports;

wherein the main module processor is configured to direct data received from an external device to the computing module processor for processing and wherein the main module processor is configured to receive processed data from the computing module and display images of the processed data on the display of the modular television system; and wherein the computing module is responsible for ultra-high definition digital video recording, transport stream demultiplexing for digital television decoding, digital multimedia decoding, providing a high quality graphical user interface of the user of the system, or allowing for the downloading and execution of third party applications.

9. The television module subsystem of claim 8, further comprising:

a timing controller module located on the main board of the television module subsystem and in communication with the display panel, the timing controller module configured to control images displayed by the display panel of the display subsystem; or a backlight controller located on the main board of the television module subsystem and in communication with the display panel, the backlight controller configured to control backlighting on the display panel.

10. The television module subsystem of claim 9, wherein both the timing controller module and the backlight controller are located in the housing of the television module subsystem.

11. The television module subsystem of claim 9, wherein the power supply is configured to supply power to the main board of the television module subsystem and the display subsystem.

12. The system of claim 9, wherein the main module processor is configured to perform analog video receiving and decoding, digital video receiving, and connecting to a network via a plurality of input/output ports.

13. A display subsystem of a modular television system, the display subsystem comprising:
- a housing;
- a display panel located within a portion of the housing;
- a display subsystem port; and
- wherein the display panel of display subsystem is configured to be controlled and powered by a separate television module subsystem via the display subsystem port, wherein the television module subsystem has a main module processor and a least one computing module port in communication with the main module processor;
- wherein the display panel display subsystem is configured to be controlled by a timing controller module configured to control images displayed by the display panel of the display subsystem;
- wherein the display panel display subsystem is configured to be controlled by a the backlight controller configured to control backlighting on the display panel;
- wherein the main module processor of the television module subsystem is configured to communicate with a removable computing module, the removable computing module is configured to connect to the computing module port of the main module, wherein the removable computing module has a computing module processor configured to assist the main module processor with presenting audio and video received by at least one of a plurality of input/output ports;
- wherein the main module processor is configured to direct data received from an external device to the computing module processor for processing and wherein the main module processor is configured to receive processed data from the computing module and display images of the processed data on the display of the modular television system; and
- wherein the computing module is responsible for ultra-high definition digital video recording, transport stream demultiplexing for digital television decoding, digital multimedia decoding, providing a high quality graphical user interface of the user of the system, or allowing for the downloading and execution of third party applications.

14. The display subsystem of claim 13, wherein the backlight controller or timing controller module is located within the housing of the display subsystem.

15. The display subsystem of claim 14, wherein both the timing controller module and the backlight controller is located in the housing of the display subsystem.

16. The display subsystem of claim 13, wherein the backlight controller or timing controller module is located within a housing of the television module subsystem.

17. The display subsystem of claim 16, wherein both the backlight controller and timing controller module is located within a housing of the television module subsystem.

* * * * *

UNITED STATES PATENT AND TRADEMARK OFFICE
CERTIFICATE OF CORRECTION

PATENT NO. : 9,973,725 B2  
APPLICATION NO. : 14/677311  
DATED : May 15, 2018  
INVENTOR(S) : Sheng Zhong Page 1 of 1

It is certified that error appears in the above-identified patent and that said Letters Patent is hereby corrected as shown below:

On the Title Page

Item (73) please correct the Assignee information: from CONTINENTAL TEVES AG & CO. OHG to Qingdao Hisense Electronics Co. LTD Signed and Sealed this  
Tenth Day of July, 2018

Andrei Iancu  
*Director of the United States Patent and Trademark Office*